US012179377B2

(12) United States Patent
Kien et al.

(10) Patent No.: US 12,179,377 B2
(45) Date of Patent: *Dec. 31, 2024

(54) METHOD OF PERFORATING A NONLINEAR LINE OF WEAKNESS

(71) Applicant: The Procter & Gamble Company, Cincinnati, OH (US)

(72) Inventors: Kathryn Christian Kien, Cincinnati, OH (US); Deborah Sue Slovut, Madeira, OH (US); Jeffrey Moss Vaughn, Colerain Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,260

(22) Filed: May 19, 2023

(65) Prior Publication Data

US 2023/0364820 A1 Nov. 16, 2023

Related U.S. Application Data

(63) Continuation of application No. 17/580,686, filed on Jan. 21, 2022, now Pat. No. 11,697,219, which is a (Continued)

(51) Int. Cl.
*B26F 1/20* (2006.01)
*B26D 1/38* (2006.01)

(Continued)

(52) U.S. Cl.
CPC ................ *B26F 1/20* (2013.01); *B26D 1/385* (2013.01); *B26D 3/085* (2013.01); *B26D 3/10* (2013.01);

(Continued)

(58) Field of Classification Search
CPC .......... B26D 1/205; B26D 1/34; B26D 1/365; B26D 1/38; B26D 2001/006; B26D 1/025;

(Continued)

(56) References Cited

U.S. PATENT DOCUMENTS 405,412 A 6/1889 Hicks
714,652 A 11/1902 Davis (Continued)

FOREIGN PATENT DOCUMENTS

DE 1090069 B 9/1960
DE 1112881 B 8/1961

(Continued)

OTHER PUBLICATIONS

All Office Actions, U.S. Appl. No. 15/984,820.

(Continued)

*Primary Examiner* — Jennifer S Matthews
(74) *Attorney, Agent, or Firm* — Richard L. Alexander; Sarah M. Decristofaro

(57) ABSTRACT

A method for perforating a web with a perforating apparatus includes: rotating a cylinder about a longitudinal cylinder axis, wherein the cylinder comprises at least one shaped blade; operatively engaging a moveable support with the cylinder; positioning an anvil disposed on the support so as to cooperate in contacting relationship with the shaped blade, wherein at least one of the blade and the anvil comprise a plurality of teeth, and wherein adjacent teeth are separated by a recessed portion; feeding a web between the cylinder and the support; and perforating the web as the anvil cooperates in contacting relationship with the shaped blade disposed on the rotating cylinder.

15 Claims, 20 Drawing Sheets

Related U.S. Application Data continuation of application No. 14/301,384, filed on Jun. 11, 2014, now Pat. No. 11,254,024.

(60) Provisional application No. 61/834,114, filed on Jun. 12, 2013.

(51) Int. Cl.

| | |
|---|---|
| ***B26D 3/08*** | (2006.01) |
| ***B26D 3/10*** | (2006.01) |
| ***B26D 7/20*** | (2006.01) |
| ***B26F 1/14*** | (2006.01) |
| *B26D 1/00* | (2006.01) |
| *B26D 5/00* | (2006.01) |
| *B26D 7/26* | (2006.01) |

(52) U.S. Cl.

CPC ................ *B26D 7/204* (2013.01); *B26F 1/14* (2013.01); *B26D 2001/002* (2013.01); *B26D 2001/006* (2013.01); *B26D 5/00* (2013.01); *B26D 7/2614* (2013.01); *B26D 2007/2692* (2013.01); *Y10T 83/0481* (2015.04)

(58) Field of Classification Search

CPC ... B26D 1/385; B26D 2007/2607; B26F 1/18; B26F 1/20; B26F 1/22; B26F 1/44; Y10T 83/9309; Y10T 83/9312; Y10T 83/9314; Y10T 83/788; Y10T 83/483; Y10T 83/4838; Y10T 83/4847

USPC ........................................... 83/169, 835–855

See application file for complete search history.

(56) References Cited

U.S. PATENT DOCUMENTS

| | | | |
|---|---|---|---|
| 1,383,868 | A | 7/1921 | Smith |
| 2,007,544 | A | 7/1935 | Meisel |
| 2,328,109 | A | 8/1943 | Thompson |
| 2,588,581 | A | 3/1952 | Sieger |
| 2,805,715 | A | 9/1957 | Abraham |
| 3,190,163 | A | 6/1965 | Bradley |
| 3,228,274 | A | 1/1966 | George |
| 3,264,921 | A | 8/1966 | Daniel |
| 3,321,145 | A | 5/1967 | Gorman |
| 3,467,250 | A | 9/1969 | Elia et al. |
| 3,583,558 | A | 6/1971 | Davis |
| 3,716,132 | A | 2/1973 | Lewyckyj |
| 3,733,949 | A | 5/1973 | Bradley |
| 3,752,304 | A | 8/1973 | Alef |
| 3,762,542 | A | 10/1973 | Grimes |
| 3,769,868 | A | 11/1973 | Hornung |
| 3,770,172 | A | 11/1973 | Nystrand et al. |
| 3,779,123 | A | 12/1973 | Chafee |
| 3,931,886 | A | 1/1976 | Yamauchi |
| 4,034,637 | A | 7/1977 | Ollery |
| 4,044,641 | A | 8/1977 | Burt, Jr. et al. |
| 4,164,329 | A | 8/1979 | Higby |
| 4,199,090 | A | 4/1980 | Reed |
| 4,210,688 | A | 7/1980 | Sato |
| 4,244,251 | A | 1/1981 | Iwao et al. |
| 4,457,964 | A | 7/1984 | Kaminstein |
| 4,610,189 | A | 9/1986 | Lombardo |
| 4,747,364 | A | 5/1988 | Horowitz |
| 4,759,247 | A | 7/1988 | Bell et al. |
| 4,884,719 | A | 12/1989 | Levine et al. |
| 5,041,317 | A | 8/1991 | Greyvenstein |
| 5,114,771 | A | 5/1992 | Ogg et al. |
| 5,117,718 | A | 6/1992 | Wittkopf |
| 5,125,302 | A | 6/1992 | Biagiotti |
| 5,205,454 | A | 4/1993 | Schutz et al. |
| 5,246,110 | A | 9/1993 | Greyvenstein |
| 5,284,304 | A | 2/1994 | Biagiotti |
| 5,344,091 | A | 9/1994 | Molison |
| 5,445,054 | A | 8/1995 | Pryor |
| 5,453,311 | A | 9/1995 | Svensson |
| 5,562,964 | A | 10/1996 | Jones |
| 5,613,347 | A | 3/1997 | Weder |
| 5,616,387 | A | 4/1997 | Augst et al. |
| 5,704,566 | A | 1/1998 | Schutz et al. |
| 5,740,657 | A | 4/1998 | Weder |
| 5,740,658 | A | 4/1998 | Weder |
| D393,950 | S | 5/1998 | Lockhart |
| 5,755,654 | A | 5/1998 | Schulz et al. |
| 5,789,050 | A | 8/1998 | Kang |
| 5,797,305 | A | 8/1998 | Harrod et al. |
| 5,806,399 | A | 9/1998 | Oechsner |
| 5,853,117 | A | 12/1998 | Traise |
| 6,029,921 | A | 2/2000 | Johnson |
| 6,092,354 | A | 7/2000 | Takahashi |
| 6,139,186 | A | 10/2000 | Fraser |
| 6,228,454 | B1 | 5/2001 | Johnson et al. |
| 6,431,491 | B1 | 8/2002 | Biagiotti |
| 6,447,864 | B2 | 9/2002 | Johnson et al. |
| 6,460,727 | B1 | 10/2002 | Irwin |
| 6,464,120 | B1 | 10/2002 | Johnson et al. |
| 6,536,624 | B2 | 3/2003 | Johnson et al. |
| 6,565,794 | B1 | 5/2003 | Fraser |
| 6,694,535 | B1 | 2/2004 | Gianesi |
| 6,698,323 | B2 | 3/2004 | Formon et al. |
| 6,838,040 | B2 | 1/2005 | Mlinar et al. |
| 6,877,689 | B2 | 4/2005 | Butterworth |
| D589,264 | S | 3/2009 | Hanafusa |
| 7,707,661 | B2 | 5/2010 | Issachar |
| 7,971,514 | B2 | 7/2011 | Alalu |
| 7,988,607 | B2 | 8/2011 | Baggot et al. |
| 8,166,857 | B2 | 5/2012 | Powell et al. |
| 8,268,429 | B2 | 9/2012 | McNeil et al. |
| 8,277,917 | B2 | 10/2012 | Neto et al. |
| 8,283,013 | B2 | 10/2012 | Feldmann et al. |
| 8,287,976 | B2 | 10/2012 | Hupp |
| 8,287,977 | B2 | 10/2012 | Mcneil et al. |
| 8,312,797 | B2 | 11/2012 | Hsu |
| 8,353,236 | B2 | 1/2013 | De Marco et al. |
| 8,443,725 | B2 | 5/2013 | Mcneil et al. |
| 8,448,816 | B2 | 5/2013 | Gordon |
| 8,468,938 | B2 | 6/2013 | Redd |
| 8,535,483 | B2 | 9/2013 | Mellin et al. |
| 8,539,867 | B2 | 9/2013 | Powell et al. |
| 8,621,966 | B2 | 1/2014 | Germaine et al. |
| 8,757,058 | B2 | 6/2014 | Kien et al. |
| 8,763,523 | B2 | 7/2014 | Mcneil et al. |
| 8,763,526 | B2 | 7/2014 | Mcneil et al. |
| 8,802,211 | B2 | 8/2014 | Cattacin et al. |
| 9,195,861 | B2 | 11/2015 | Bigari et al. |
| 9,259,848 | B2 | 2/2016 | Hupp et al. |
| 9,409,372 | B2 | 8/2016 | Hada et al. |
| 9,486,932 | B2 | 11/2016 | Baggot et al. |
| 9,539,735 | B2 | 1/2017 | Ferguson |
| 9,592,621 | B2 | 3/2017 | Demarco et al. |
| 9,918,595 | B2 | 3/2018 | Olson et al. |
| 9,918,596 | B2 | 3/2018 | Olson et al. |
| 9,950,892 | B2 | 4/2018 | Slovut et al. |
| 10,005,197 | B2 | 6/2018 | Kien et al. |
| 10,188,242 | B2 | 1/2019 | Olson et al. |
| 10,232,524 | B2 | 3/2019 | Slovut et al. |
| 10,293,510 | B2 | 5/2019 | Slovut et al. |
| 10,524,622 | B2 | 1/2020 | Olson et al. |
| 10,814,513 | B2 | 10/2020 | Kien et al. |
| 10,857,690 | B2 | 12/2020 | Schwamberger et al. |
| 10,889,459 | B2 | 1/2021 | Slovut et al. |
| 10,946,545 | B2 | 3/2021 | Kien et al. |
| 10,947,671 | B2 | 3/2021 | Glass et al. |
| 10,960,566 | B2 | 3/2021 | Slovut et al. |
| 11,008,709 | B2 | 5/2021 | Glass et al. |
| 11,008,710 | B2 | 5/2021 | Glass et al. |
| 2001/0000737 | A1 | 5/2001 | Johnson et al. |
| 2002/0155246 | A1 | 10/2002 | Johnson et al. |
| 2003/0000357 | A1 | 1/2003 | Tanaka |
| 2003/0033914 | A1 | 2/2003 | Mutchnik et al. |
| 2003/0132549 | A1 | 7/2003 | Mlinar et al. |
| 2003/0172785 | A1 | 9/2003 | Formon et al. |
| 2003/0218040 | A1 | 11/2003 | Faulks et al. |
| 2003/0226431 | A1 | 12/2003 | Motard |

(56) References Cited

U.S. PATENT DOCUMENTS

| | | | |
|---|---|---|---|
| 2004/0003699 | A1 | 1/2004 | Welch |
| 2004/0064911 | A1 | 4/2004 | Klupfel et al. |
| 2004/0159693 | A1 | 8/2004 | Adachi et al. |
| 2004/0182213 | A1 | 9/2004 | Wagner et al. |
| 2004/0188556 | A1 | 9/2004 | Jong |
| 2004/0244556 | A1 | 12/2004 | Neal |
| 2005/0100715 | A1 | 5/2005 | Bredahl et al. |
| 2005/0115372 | A1 | 6/2005 | Cavlin |
| 2005/0155478 | A1 | 7/2005 | Zimmer |
| 2006/0011030 | A1 | 1/2006 | Wagner et al. |
| 2007/0000364 | A1 | 1/2007 | Powell et al. |
| 2007/0014961 | A1 | 1/2007 | Schneider et al. |
| 2007/0023135 | A1 | 2/2007 | Giacometti |
| 2007/0044613 | A1 | 3/2007 | Cohn |
| 2007/0209099 | A1 | 9/2007 | Issachar |
| 2008/0028902 | A1 | 2/2008 | Baggot et al. |
| 2008/0280088 | A1 | 11/2008 | Baum |
| 2009/0212153 | A1 | 8/2009 | Alalu |
| 2009/0235800 | A1 | 9/2009 | Germaine et al. |
| 2010/0112264 | A1 | 5/2010 | Barredo |
| 2010/0167896 | A1 | 7/2010 | Hada et al. |
| 2010/0199822 | A1 | 8/2010 | De Marco et al. |
| 2010/0242698 | A1 | 9/2010 | Hsu |
| 2010/0243780 | A1 | 9/2010 | Neto |
| 2010/0264159 | A1 | 10/2010 | Gordon |
| 2010/0309544 | A1 | 12/2010 | Nomura et al. |
| 2011/0192263 | A1 | 8/2011 | De Marco et al. |
| 2011/0290920 | A1 | 12/2011 | Kim et al. |
| 2011/0308363 | A1 | 12/2011 | Kien et al. |
| 2011/0308366 | A1 | 12/2011 | Redd |
| 2011/0308370 | A1 | 12/2011 | Hupp et al. |
| 2011/0308372 | A1 | 12/2011 | McNeil et al. |
| 2011/0308405 | A1 | 12/2011 | McNeil et al. |
| 2011/0308406 | A1 | 12/2011 | McNeil et al. |
| 2011/0308754 | A1 | 12/2011 | McNeil et al. |
| 2011/0311748 | A1 | 12/2011 | Hupp |
| 2011/0311749 | A1 | 12/2011 | McNeil et al. |
| 2011/0311750 | A1 | 12/2011 | McNeil et al. |
| 2011/0311751 | A1 | 12/2011 | Feldmann et al. |
| 2012/0111166 | A1 | 5/2012 | Yamada et al. |
| 2012/0174720 | A1 | 7/2012 | Powell et al. |
| 2012/0198979 | A1 | 8/2012 | Ohsawa |
| 2012/0216663 | A1 | 8/2012 | Carmichael |
| 2012/0234145 | A1 | 9/2012 | Kandemir |
| 2012/0234152 | A1 | 9/2012 | Carmichael |
| 2012/0245011 | A1 | 9/2012 | De Matteis |
| 2013/0036884 | A1 | 2/2013 | Schurch et al. |
| 2013/0049438 | A1 | 2/2013 | Nootbaar et al. |
| 2013/0294808 | A1 | 11/2013 | Douillard et al. |
| 2014/0174270 | A1 | 6/2014 | Demarco et al. |
| 2014/0238210 | A1 | 8/2014 | Baggot et al. |
| 2014/0344702 | A1 | 11/2014 | Edge et al. |
| 2014/0346704 | A1 | 11/2014 | Sartini et al. |
| 2014/0366695 | A1 | 12/2014 | Kien et al. |
| 2014/0366702 | A1 | 12/2014 | Kien et al. |
| 2014/0370224 | A1 | 12/2014 | Kien et al. |
| 2015/0135925 | A1 | 5/2015 | Abrahams |
| 2015/0298340 | A1 | 10/2015 | Baggot et al. |
| 2016/0144525 | A1 | 5/2016 | Kenmotsu et al. |
| 2016/0271820 | A1 | 9/2016 | Slovut et al. |
| 2016/0271823 | A1 | 9/2016 | Slovut et al. |
| 2016/0271824 | A1 | 9/2016 | Slovut et al. |
| 2016/0345761 | A1 | 12/2016 | Olson et al. |
| 2016/0345786 | A1 | 12/2016 | Olson et al. |
| 2017/0280946 | A1 | 10/2017 | Weisang et al. |
| 2018/0132674 | A1 | 5/2018 | Olson et al. |
| 2018/0199766 | A1 | 7/2018 | Olson et al. |
| 2018/0201464 | A1 | 7/2018 | Slovut et al. |
| 2018/0264676 | A1 | 9/2018 | Kien et al. |
| 2018/0361606 | A1 | 12/2018 | Banowetz et al. |
| 2019/0077038 | A1 | 3/2019 | Glass et al. |
| 2019/0077039 | A1 | 3/2019 | Glass et al. |
| 2019/0078263 | A1 | 3/2019 | Glass et al. |
| 2019/0078264 | A1 | 3/2019 | Glass et al. |
| 2019/0078265 | A1 | 3/2019 | Glass et al. |
| 2019/0078266 | A1 | 3/2019 | Glass et al. |
| 2019/0078267 | A1 | 3/2019 | Glass et al. |
| 2019/0125139 | A1 | 5/2019 | Olson et al. |
| 2019/0152081 | A1 | 5/2019 | Slovut et al. |
| 2019/0232517 | A1 | 8/2019 | Slovut et al. |
| 2020/0078976 | A1 | 3/2020 | Schwamberger et al. |
| 2020/0085246 | A1 | 3/2020 | Olson et al. |
| 2020/0094998 | A1 | 3/2020 | Horz |
| 2020/0214511 | A1 | 7/2020 | Olson et al. |
| 2020/0290792 | A1 | 9/2020 | Yasui |
| 2021/0060809 | A1 | 3/2021 | Schwamberger et al. |
| 2021/0101772 | A1 | 4/2021 | Slovut et al. |
| 2021/0146566 | A1 | 5/2021 | Slovut et al. |
| 2021/0180258 | A1 | 6/2021 | Glass et al. |
| 2021/0187776 | A1 | 6/2021 | Slovut et al. |
| 2021/0197415 | A1 | 7/2021 | Kien et al. |

FOREIGN PATENT DOCUMENTS

| | | | |
|---|---|---|---|
| DE | 1291188 | B | 3/1969 |
| DE | 2706234 | A1 | 8/1978 |
| DE | 10356037 | A1 | 7/2005 |
| DE | 202005017013 | U1 | 1/2006 |
| DE | 102005041180 | A1 | 3/2007 |
| EP | 1010503 | A2 | 6/2000 |
| FR | 2161144 | A5 | 7/1973 |
| FR | 2377471 | A1 | 8/1978 |
| GB | 808244 | A | 1/1959 |
| GB | 923029 | A | 4/1963 |
| GB | 2488782 | A | 9/2012 |
| JP | H0884685 | A | 4/1996 |
| JP | 2005153997 | A | 6/2005 |
| JP | 2005296588 | A | 10/2005 |
| JP | 2007117366 | A | 5/2007 |
| WO | 9002639 | A1 | 3/1990 |
| WO | 9723398 | A1 | 7/1997 |
| WO | 9825738 | A1 | 6/1998 |
| WO | 02100614 | A1 | 12/2002 |

OTHER PUBLICATIONS

All Office Actions, U.S. Appl. No. 14/301,384.
All Office Actions, U.S. Appl. No. 14/301,392.
All Office Actions; U.S. Appl. No. 17/580,686, filed Jan. 21, 2022.
PCT Search Report and Written Opinion for PCT/US2014/041819 dated Sep. 23, 2014, 11 pages.
Unpublished U.S. Appl. No. 17/580,686, filed Jan. 21, 2022, to Kathryn Christian Kien et al.
Unpublished U.S. Appl. No. 18/354,245, filed Jul. 18, 2023, Kathryn Christian Kien et al.

METHOD OF PERFORATING A NONLINEAR LINE OF WEAKNESS

CROSS REFERENCE TO RELATED APPLICATIONS

This application is a continuation of, and claims priority under 35 U.S.C. § 120 to, U.S. Patent application Ser. No. 17/580,686, filed on Jan. 21, 2022, which is a continuation of, and claims priority under 35 U.S.C. § 120 to, U.S. patent application Ser. No. 14/301,384, filed on Jun. 11, 2014, now granted U.S. Pat. No. 11,254,024 issued Feb. 22, 2022, which claims the benefit, under 35 USC § 119(e), of U.S. Provisional Patent Application Ser. No. 61/834,114, filed on Jun. 12, 2013, the entire disclosures of which are fully incorporated by reference herein.

FIELD OF THE INVENTION

The present disclosure relates to nonlinear lines of weakness for rolled products, and more specifically, relates to the method for producing a nonlinear line of weakness for rolled products.

BACKGROUND

Many articles and packages include or can include a strip of material that has a line of weakness having one or more perforations to aid in tearing the article or package. For example, articles can include wax paper, aluminum foil, disposable bags, and sanitary tissue products, such as toilet tissue, facial tissue, and paper towels manufactured in the form of a web. Sanitary tissue products include lines of weakness to permit tearing off discrete sheets, for example, as is well known in the art. Such products are commonly used in households, businesses, restaurants, shops, and the like.

Typically, a line of weakness consists of a straight perforation across the width of the web. Creating perforations at high speeds and long widths is very challenging. Small vibrations in the equipment can result in non-perforated areas and/or inconsistent quality in the perforation and/or additional wear on the equipment. Further, tight tolerances between equipment must be maintained. Generally, there are three ways to perforate webs: die cutting, laser cutting, and flex blade cutting. Die cutting is a compression or crush cut in which a knife contacts a hardened anvil roll or a male roll interacts with a female roll to create one or more perforations. Die cutting usually is associated with high replacement costs and low speeds. Further die cutting does not allow for accuracy at long widths or mismatched speed operation. Similarly, laser cutting is a high-powered method to perforate webs. Laser cutting is usually used on thicker substrates and on cuts requiring a high degree of accuracy. Still further, flex blade cutting is a cut created by shearing the web. Flex blade cutting requires at least one blade to flex against a relatively stationary blade or anvil during operation to cut the web. Relative to the above cutting methods, flex blade cutting is generally lower cost, can be performed at higher speeds, and can be run at mismatched speeds. In addition to the above, water jet, steam, and spark aperture cutting methods can also be used to create lines of weakness. These methods have been found to be incompatible with the product being manufactured and/or inadequate for high speed, low cost production of perforated webs.

For example, using two rotating rolls to create a shaped line of weakness can be complex and expensive. The two rotating rolls must be matched to come together at exactly the right moment in time. Stated another way, the male roll must be synchronized with the female roll. Further, creating perforations with a rotating male roll and a rotating female roll can require a greater force be imparted to the web to create the line of weakness. Finally, the equipment to create such a line of weakness is large and must operate at lower speeds to maintain proper matching of the rolls.

It has been found that consumers desire products that are usable and have a distinguishing feature over other products. Manufacturers of various products, for example sanitary tissue products, desire that consumers of such products be able to readily distinguish their products from similar products produced by competitors. One way a manufacturer can distinguish its products from other products is to impart physical characteristics into the web that differ from other manufacturers' products. A shaped perforation is one distinguishing characteristic that can be added to the product. The shape of the line of weakness would not only provide a way for consumers to distinguish a manufacture's product, but also communicate to consumers a perception of luxury, elegance, and softness and/or strength.

Further, manufactures desire a shaped perforation that consumers of such products can easily and readily interact with. Often a straight perforation on a sanitary tissue product, for example, can rest directly on the adjacent layer making it difficult to see the end of the sheet. This can make it difficult for a user to locate, grasp, and/or dispense the product. A straight perforation can allow for only a single plane of the product on which a user can grasp for dispensing.

However, producing a web with a shaped perforation adds more complexity to the manufacturing process. As previously stated, tight tolerances and minimal to no vibration are required in manufacturing a line of weakness at the high speeds necessary for commercial viability. Thus, adding a shape to the anvil and/or the blade can increase the risk of introducing processing complexities and complications into commercial manufacturing operations for a perforated web.

Still further, as previously stated, consumers desire a product that they can easily and readily interact with. A shaped perforation adds a degree of complexity to the processing capability of manufactures to provide a product that tears at least as well as a currently marketed product having a straight line of weakness. Further, imparting a shaped line of weakness in the product can lead to unequal perforations and/or inconsistency in tearing.

Accordingly, there is a continuing unmet need for an improved perforating apparatus to manufacture a web with a shaped line of weakness.

Accordingly, there is a continuing unmet need for an improved method to manufacture a web with a shaped line of weakness.

Still further, there is a continuing unmet need for a sanitary tissue product having individual sheets separated by shaped lines of weakness, and which allows consumers to easily and readily interact with the product. More specifically, there is a continuing unmet need for a sanitary tissue product that allows the consumer to grasp the first, exposed sheet of the product readily and easily for dispensing and use.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting embodiments of the disclosure taken in conjunction with the accompanying drawings, wherein:

FIGS. 10A-10R are schematic representations showing the progression of a web being perforated in accordance with one non-limiting embodiment of the present disclosure;

DETAILED DESCRIPTION

Figure 1:
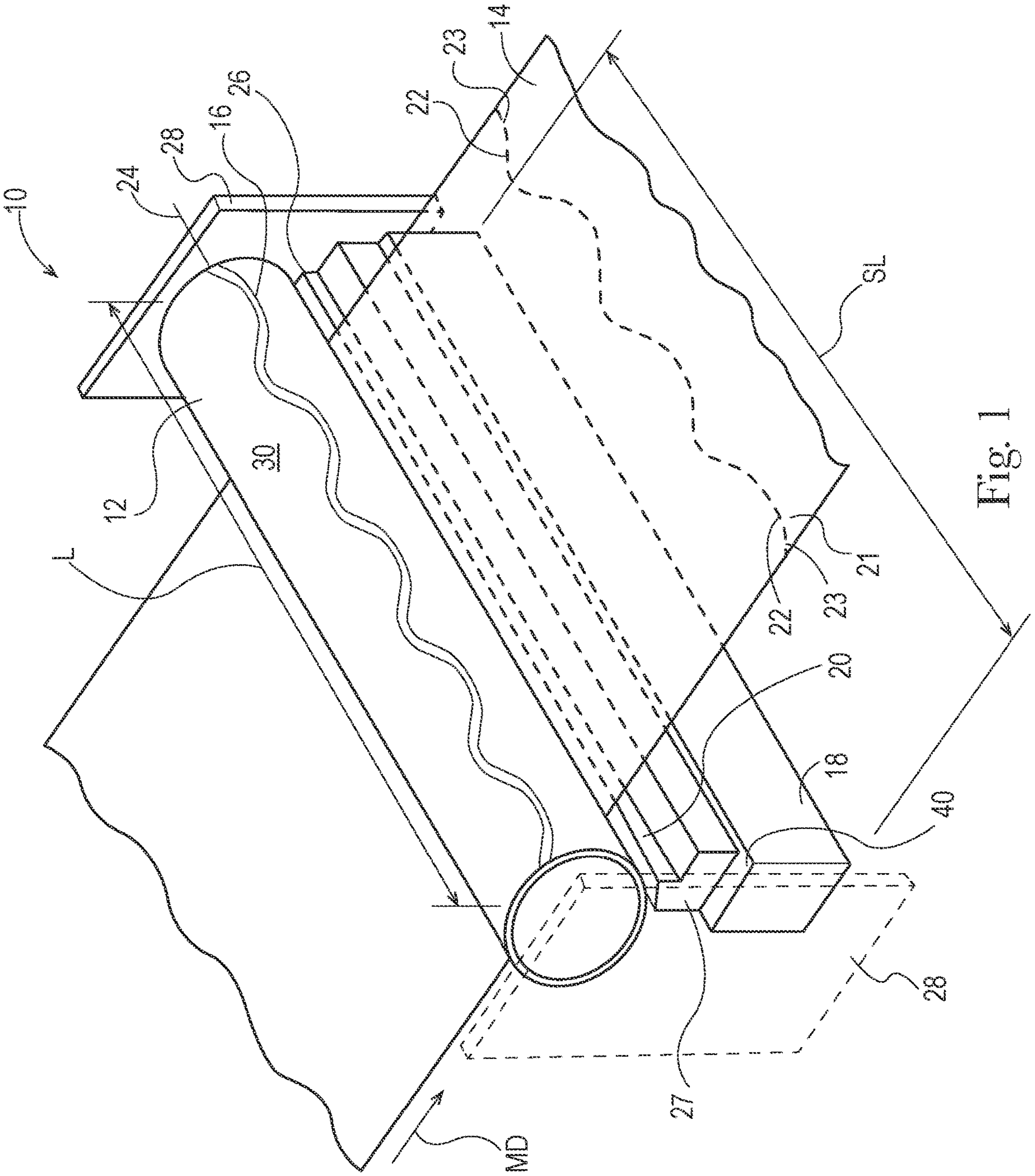
FIG. 1 is a perspective view of a perforating apparatus in accordance with one non-limiting embodiment of the present disclosure.

Various non-limiting embodiments of the present disclosure will now be described to provide an overall understanding of the principles of the structure, function, manufacture, and use of a web comprising a shaped line of weakness. The features illustrated or described in connection with one non-limiting embodiment can be combined with the features of other non-limiting embodiments. Such modifications and variations are intended to be included within the scope of this disclosure.

"Fibrous structure" as used herein means a structure that comprises one or more fibrous elements. In one example, a fibrous structure according to the present disclosure means an association of fibrous elements that together form a structure capable of performing a function. A nonlimiting example of a fibrous structure of the present disclosure is an absorbent paper product, which can be a sanitary tissue product such as a paper towel, bath tissue, or other rolled, absorbent paper product.

Non-limiting examples of processes for making fibrous structures include known wet-laid papermaking processes, air-laid papermaking processes, and wet, solution, and dry filament spinning processes, for example meltblowing and spunbonding spinning processes, that are typically referred to as nonwoven processes. Such processes can comprise the steps of preparing a fiber composition in the form of a suspension in a medium, either wet, more specifically aqueous medium, or dry, more specifically gaseous, i.e. with air as medium. The aqueous medium used for wet-laid processes is oftentimes referred to as fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure can be carried out such that a finished fibrous structure is formed. For example, in typical papermaking processes, the finished fibrous structure is the fibrous structure that is wound on the reel at the end of papermaking and can subsequently be converted into a finished product (e.g., a sanitary tissue product).

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present disclosure may be spun from polymer melt compositions via suitable spinning operations, such as meltblowing and/or spunbonding and/or they may be obtained from natural sources such as vegetative sources, for example trees.

The fibrous elements of the present disclosure may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.). A fiber can be elongate physical structure having an apparent length greatly exceeding its apparent diameter (i.e., a length to diameter ratio of at least about 10.) Fibers having a non-circular cross-section and/or tubular shape are common; the "diameter" in this case can be considered to be the diameter of a circle having a cross-sectional area equal to the cross-sectional area of the fiber.

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present disclosure, a fiber may be a naturally occurring fiber, which means it is obtained from a naturally occurring source, such as a vegetative source, for example a tree and/or other plant. Such fibers are typically used in papermaking and are oftentimes referred to as papermaking fibers. Papermaking fibers useful in the present disclosure include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present disclosure are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, and bagasse fibers can be used in the fibrous structures of the present disclosure.

"Sanitary tissue product" as used herein means one or more finished fibrous structures, that is useful as a wiping implement for post-urinary and post-bowel movement cleaning (e.g., toilet tissue, also referred to as bath tissue, and wet wipes), for otorhinolaryngological discharges (e.g., facial tissue), and multi-functional absorbent and cleaning and drying uses (e.g., paper towels, shop towels). The sanitary tissue products can be embossed or not embossed and creped or uncreped.

In one example, sanitary tissue products rolled about a fibrous core of the present disclosure can have a basis weight between about 10 g/m$^2$ to about 160 g/m$^2$ or from about 20 g/m$^2$ to about 150 g/m$^2$ or from about 35 g/m$^2$ to about 120 g/m$^2$ or from about 55 to 100 g/m$^2$, specifically reciting all 0.1 g/m$^2$ increments within the recited ranges. In addition, the sanitary tissue products can have a basis weight between about 40 g/m$^2$ to about 140 g/m$^2$ and/or from about 50 g/m$^2$ to about 120 g/m$^2$ and/or from about 55 g/m$^2$ to about 105 g/m$^2$ and/or from about 60 to 100 g/m$^2$, specifically reciting all 0.1 g/m$^2$ increments within the recited ranges. Other basis weights for other materials, such as wrapping paper and aluminum foil, are also within the scope of the present disclosure.

"Basis Weight" as used herein is the weight per unit area of a sample reported in lbs/3000 ft$^2$ or g/m$^2$. Basis weight can be measured by preparing one or more samples to create a total area (i.e., flat, in the material's non-cylindrical form) of at least 100 in$^2$ (accurate to +/−0.1 in$^2$) and weighing the sample(s) on a top loading calibrated balance with a resolution of 0.001 g or smaller. The balance is protected from air drafts and other disturbances using a draft shield. Weights are recorded when the readings on the balance become constant. The total weight (lbs or g) is calculated and the total area of the samples (ft$^2$ or m$^2$) is measured. The basis weight in units of lbs/3,000 ft$^2$ is calculated by dividing the total weight (lbs) by the total area of the samples (ft$^2$) and multiplying by 3000. The basis weight in units of g/m$^2$ is calculated by dividing the total weight (g) by the total area of the samples (m$^2$).

"Density" as used hereing is calculated as the quotient of the Basis Weight expressed in grams per square meter divided by the Caliper expressed in microns. The resulting Density is expressed as grams per cubic centimeter (g/cm$^3$ or g/cc). Sanitary tissue products of the present disclosure can have a density of greater than about 0.05 g/cm$^3$ and/or greater than 0.06 g/cm$^3$ and/or greater than 0.07 g/cm$^3$ and/or less than 0.10 g/cm$^3$ and/or less than 0.09 g/cm$^3$ and/or less than 0.08 g/cm$^3$ and/or less than 0.60 g/cm$^3$ and/or less than 0.30 g/cm$^3$ and/or less than 0.20 g/cm$^3$ and/or less than 0.15 g/cm$^3$ and/or less than 0.10 g/cm$^3$ and/or less than 0.07 g/cm$^3$ and/or less than 0.05 g/cm$^3$ and/or from about 0.01 g/cm$^3$ to about 0.20 g/cm$^3$ and/or from about 0.02 g/cm$^3$ to about 0.15 g/cm$^3$ and/or from about 0.02 g/cm$^3$ to about 0.10 g/cm$^3$.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Rolled product(s)" as used herein include plastics, fibrous structures, paper, sanitary tissue products, paperboard, polymeric materials, aluminum foils, and/or films that are in the form of a web and can be wound about a core. For example, the sanitary tissue product can be convolutedly wound upon itself about a core or without a core to form a sanitary tissue product roll or can be in the form of discrete sheets, as is commonly known for toilet tissue and paper towels.

"Machine Direction," MD, as used herein is the direction of manufacture for a perforated web. The machine direction can be the direction in which a web is fed through a perforating apparatus that can comprise a rotating cylinder and support, as discussed below in one embodiment. The machine direction can be the direction in which web travels as it passes through a blade and an anvil of a perforating apparatus.

"Cross Machine Direction," CD as used herein is the direction substantially perpendicular to the machine direction. The cross machine direction can be substantially perpendicular to the direction in which a web is fed through a cylinder and lower support in one embodiment. The cross machine direction can be the direction substantially perpendicular to the direction in which web travels as it passes through a blade and an anvil.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Referring to FIG. 1, a perforating apparatus 10 is shown for forming a shaped line of weakness 21 comprising one or more perforations 22 on a web 14. The perforating apparatus 10 comprises a cylinder 12 and a support 18. The cylinder 12 can be suspended between one or more braces 28 that serve to hold cylinder 12 in operative position. The cylinder 12 has a longitudinal cylinder axis 24 about which the cylinder 12 is rotatable. The cylinder 12 can have a substantially circular shaped cross-section or oval-like shaped cross-section or any other shaped cross-section that can rotate about an axis and operatively engage a support 18. The cylinder 12 can comprise an outer surface 30 positioned radially outward from and substantially surrounding the longitudinal cylinder axis 24.

The cylinder 12 can comprise an anvil. In one example embodiment, the anvil 12 can be disposed on the outer surface 30 of the cylinder 12. In another example embodiment, the anvil 16 can be disposed on an anvil insert 29 that can be removably attached to the cylinder 12. The anvil insert 29 can be magnetically attached to the outer surface 30 of the cylinder 12. In another embodiment, the anvil insert 29 can be chemically attached, such as by glue, or mechanically attached, such as by clamping, bolting, or otherwise joining to the outer surface 30 of the cylinder 12. Opposite the cylinder 12, the support 18 can comprise a blade 20. The blade 20 can be disposed on the support 18. By "disposed" is meant the blade can be attached, removeably attached, clamped, bolted, or otherwise held by the support 18 in a stable operative position with respect to the cylinder 12.

Figure 2:
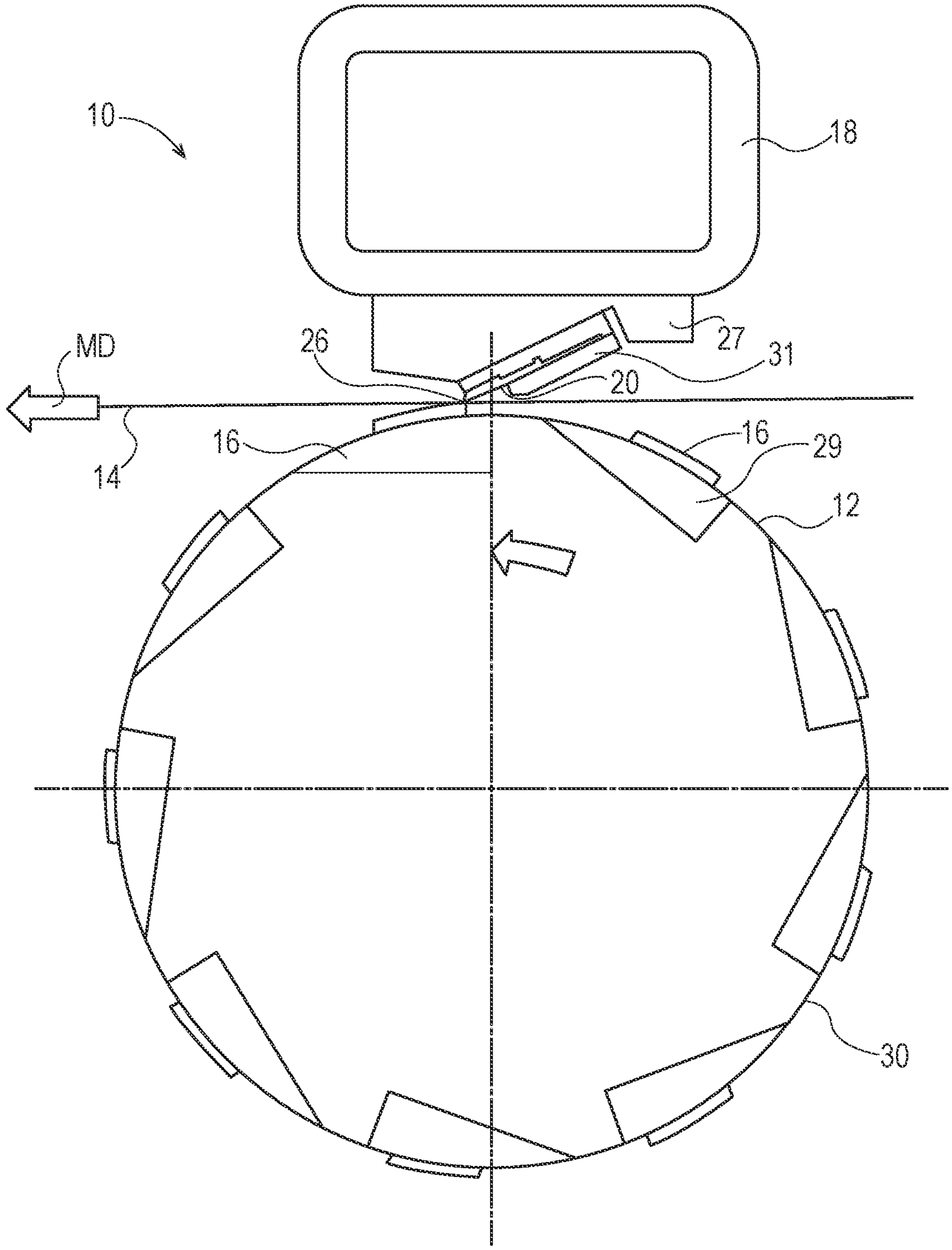
FIG. 2 is a partial side elevation view of a perforating apparatus in accordance with one non-limiting embodiment of the present disclosure.

In another example embodiment, the support 18 can comprise a blade holder 27. The blade 20 can be disposed on the blade holder 27 in such a manner as to maintain sufficient stability when in contacting engagement with the anvil 16. Further, a clamp 31, shown in FIG. 2, can be disposed on the blade holder 27 and partially surround the blade 20. The clamp 31 can be designed generally as indicated in FIG. 2 with the blade being held between two parts of the clamp that can each flex relative to the other. In this manner the clamp 31 can removably hold the blade 20 such that the blade 20 can deflect when it contacts the anvil 16. This deflection and the inherent flexibility of the blade 20 allows for improved perforation reliability by being more forgiving to slight differences in machine tolerances. Thus, the support 18 serves to hold the blade holder 27, which can include a clamp 31, and thus the blade 20, in a relatively stable orientation during operation.

The cylinder 12 is moveable such that the cylinder 12 can operatively engage with the support 18. Operative engagement means the support 18 can be arranged in relationship to the cylinder 12 such that the blade 20 can make contact with the anvil 16 as it rotates past the blade 20; the contact sufficient to make one or more perforations 22 in a web 14. In one embodiment, the contact between the anvil 16 and the blade 20 is a shearing action. Thus, in one embodiment, the perforating apparatus can be a shear-cutting device. The blade 20 can be disposed on the support 18 so as to cooperate in contacting relationship with the anvil 20 disposed on the cylinder 12 to impart a line of weakness 21 comprising one or more perforations 22 and one or more bond areas 23 in the web 14. The bond areas 23 are the portion of the web between two adjacent perforations. The inventors found a unique and surprising result from shaping the element disposed on the rotating cylinder 12. In one embodiment, the shaped element can comprise the anvil 16. The resulting perforation on the sheet takes on the same or a similar shape as the shaped rotating element, which, in one embodiment is a shaped anvil 16. The same result does not occur if the shape is not on the rotating roll.

As previously stated, the line of weakness 21 comprising perforations 22 and bond areas 23 can be the shape of the anvil 16. The characteristics of the one or more perforations 22 and bond areas 23 can be due, in part, to the interaction point 26. Referring to FIGS. 1-4, the interaction point 26 is the point where contact occurs between the anvil 16 and blade 20. The characteristics of the perforations 22 can be a result of the amount of overlap between the blade and anvil 16 and how the blade 20 and the anvil 16 cooperate in contacting relationship. For example, the blade 20 against the anvil 16 can result in a shearing action that imparts certain characteristics to the perforations 22. In one embodiment, the interaction point 26 can be adjusted by moving the support 18 and/or the cylinder 12. In an alternative embodiment, the interaction point 26 can be adjusted by moving the anvil insert 29 on which the anvil 16 is disposed and/or the blade holder 27 and/or the clamp 31 on which the blade 20 can be disposed. Thus, the interaction point 26 can be increased or decreased, which alters the characteristics of the resulting line of weakness 21 imparted to the web 14 and, thus, the characteristics of each perforation 22 and bond area 23. The interaction point 26, the overlap of the blade 20 operatively engaging the anvil 16, can be from about 0.0001 inches to about 0.01 inches and/or from about 0.0005 inches to about 0.009 inches, including all 1/10000 of an inch therebetween. For example, an overlap of 0.0006 inches would be covered in the above range. By increasing the overlap between the blade 20 and the anvil 16, the perforations 22 generally become more pronounced, more visible, crisper and longer. By decreasing the overlap between the blade 20 and the anvil 16, the perforations 22 generally become less pronounced, less visible, shorter, and the bond 23 becomes wider and thus stronger. Thus, the interaction point 26 can be an important design consideration to create a line of weakness 21 comprising a plurality of perforations 22 and bond areas 23 between adjacent perforations 22 that allow the sheets to be held together during the manufacturing process and easily separated by consumers during use.

As stated above, the anvil 16 and the blade 20 cooperate in contacting relationship. Generally, the anvil 16 can be a substantially hardened steel surface such that there is little to no deflection of the anvil 16 as it cooperates with the blade 20. By contrast, as the blade 20 cooperates with the anvil 16, the blade 20 can deflect against the anvil 16 creating a line of weakness 21 in the web 14. In one embodiment, the clamp 31 can be designed such that it allows the blade 20 to flex as it interacts with the anvil 16. More specifically, as shown in FIG. 2, the clamp 31 can be designed with an opening that allows at least a portion of the clamp 31 (for example, the lower portion shown in FIG. 2) to move as the blade 20 interacts with the anvil 16. Alternatively, the clamp 31 can be designed such that the blade 20 remains substantially rigid as it interacts with the anvil 16. The rigidity/flexibility of the blade 20 against the anvil 16 can also alter the characteristics of the resulting line of weakness 21 imparted to the web 14, and, thus, the characteristics of each perforation 22 and bond area 23. The line of weakness 21 can be imparted to the web 14 in the cross machine direction CD as the web 14 proceeds through the perforating apparatus 10 in the machine direction MD.

Figure 3:
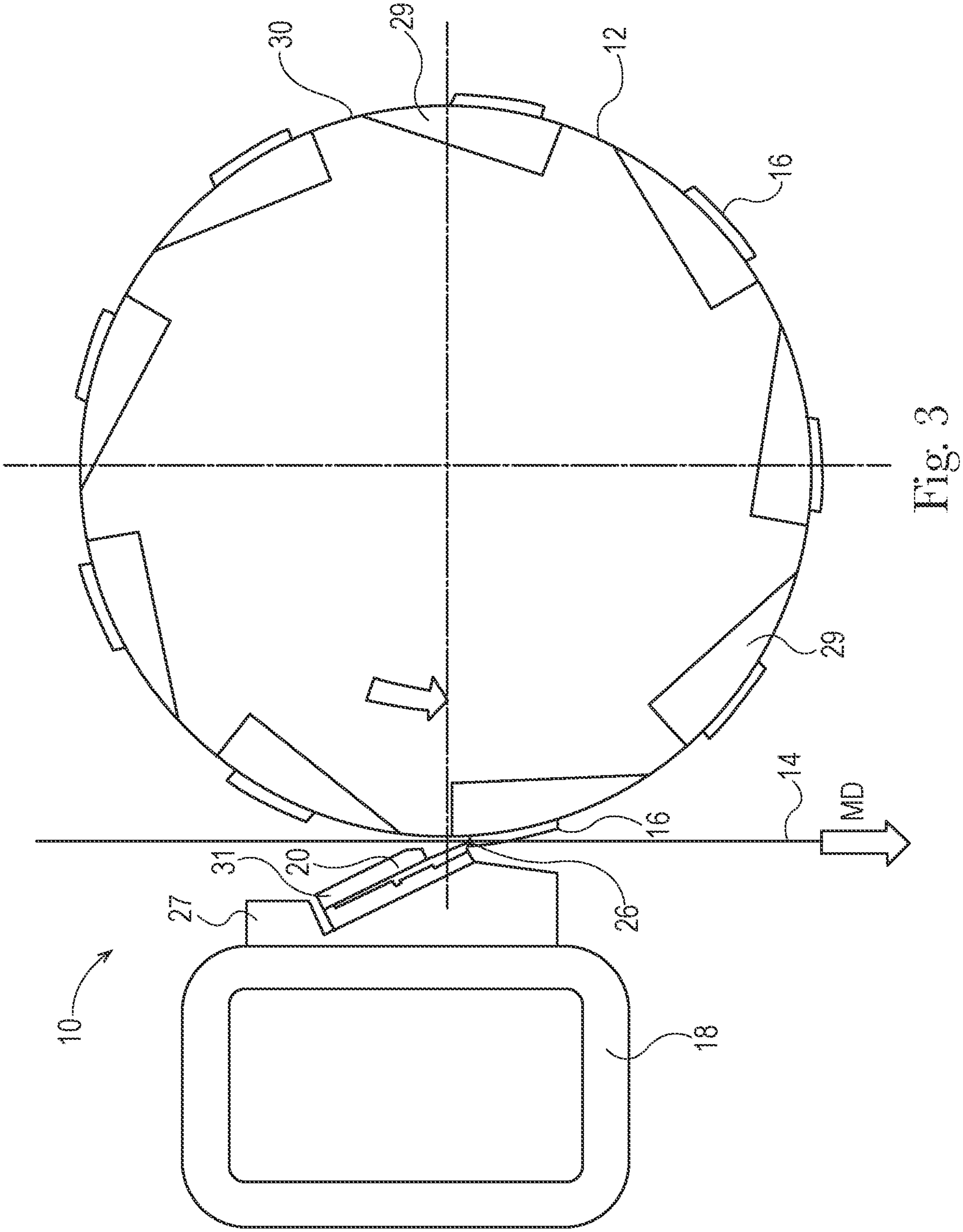
FIG. 3 is a partial side elevation view of a perforating apparatus in accordance with one non-limiting embodiment of the present disclosure.

Referring to FIGS. 1-3, the support 18 can be positioned in a number of orientations relative to the cylinder 12 and still result in the anvil 16 operatively engaging the blade 20. As shown in FIG. 1, the support 18 can be positioned below the cylinder 12 as the web 14 is perforated. In another embodiment, as shown in FIG. 2, the cylinder 12 can be positioned below the support 18. In yet another embodiment, the cylinder 12 and the support 18 can be positioned side by side, as shown in FIG. 3. The support 18 and cylinder 12 can be placed in any position relative to one another that allows for the blade 20 and anvil 16 to cooperate in contacting relationship to form a line of weakness 21 across the width of web 14. Stated another way, the support 18 and the cylinder 12 can be placed in any position relative to one another such that an interaction point 26 exists between the blade 20 and the anvil 16 sufficient to form a line of weakness 21 across the width of web 14. Alternatively or in addition to the adjustment of the support 18 and the cylinder 12, the anvil insert 29 and/or the blade holder 27 and/or the clamp 31 can be adjusted with respect to one another such that an interaction point 26 exists between the blade 20 and the anvil 16 sufficient to form a line of weakness 21 across the web 14. In one embodiment, for example, the blade 20 can be adjusted in the clamp 31 such that the blade 20 forms an interaction point 26 with each anvil 16 disposed about the cylinder 12.

Figure 4:
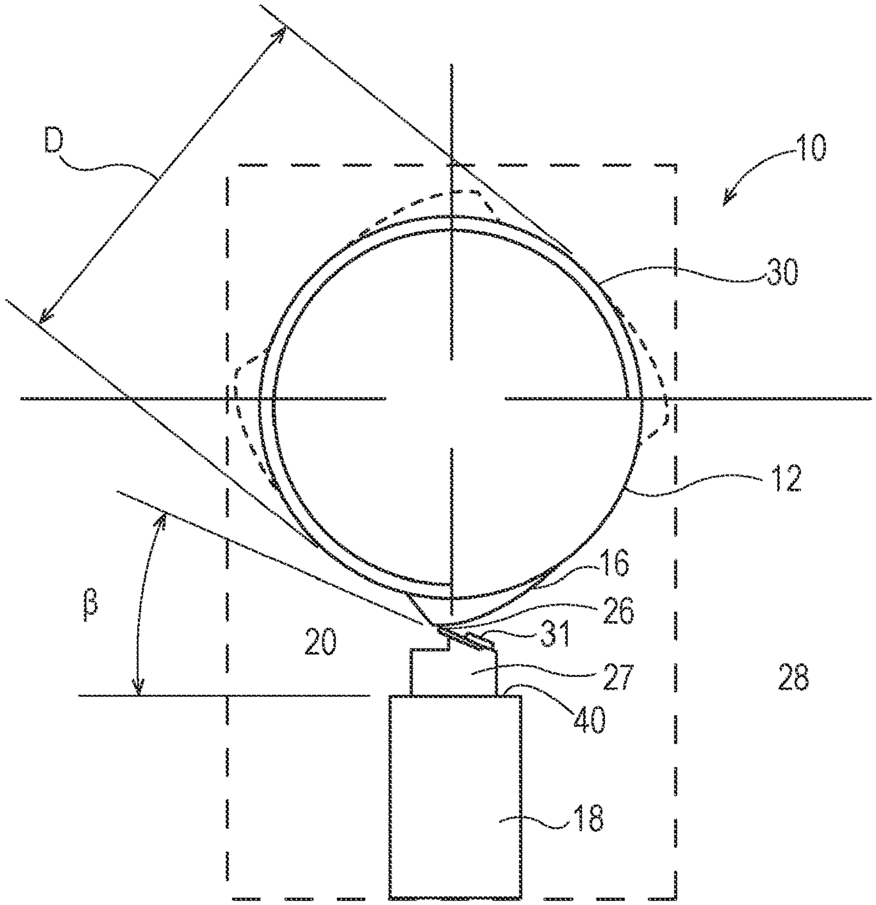
FIG. 4 is a partial side elevation view of a perforating apparatus in accordance with one non-limiting embodiment of the present disclosure.
Figure 4A:
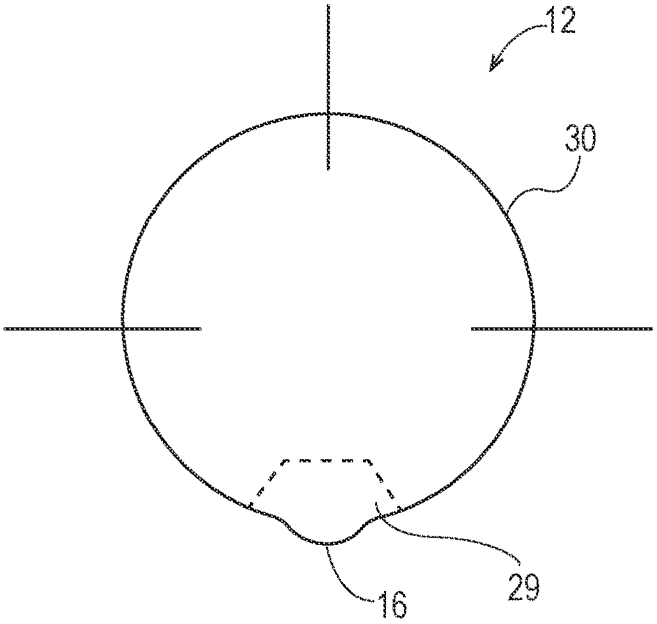
FIG. 4A is a side elevation view of an anvil disposed on a cylinder in accordance with one non-limiting embodiment of the present disclosure.

The cylinder 12 can be a solid or substantially hollow cylindrical shaped device having a hardened outer surface 30. The cylinder 12 can be formed of metal, such as steel, or some other material known to those skilled in the art to be suitable for use in forming perforations in a web. The outer surface 30 can be substantially smooth apart from or including the anvil 16. The cylinder has a length L, as shown in FIG. 1, and a diameter D, as shown in FIG. 4. The diameter D and the Length L can be sized to handle the length and width of a web 14 that can pass over the outer surface 30 of cylinder 12. For example, in one embodiment, a web can comprise a finished fibrous structure having a substantially continuous length, a width of about 10 inches to about 125 inches, and a thickness of about 0.009 inches to about 0.070 inches. Alternatively, the length L of the cylinder 12 can be sized to be substantially the same length as the support 18, such that the blade 20 can operatively engage the anvil 16 along its full length. In one embodiment, the cylinder 12 can have a diameter D of about 5 inches to about 20 inches and/or about 8 inches to about 15 inches. The cylinder 12 can have a length L of about 10 inches to about 150 inches.

Figure 5:
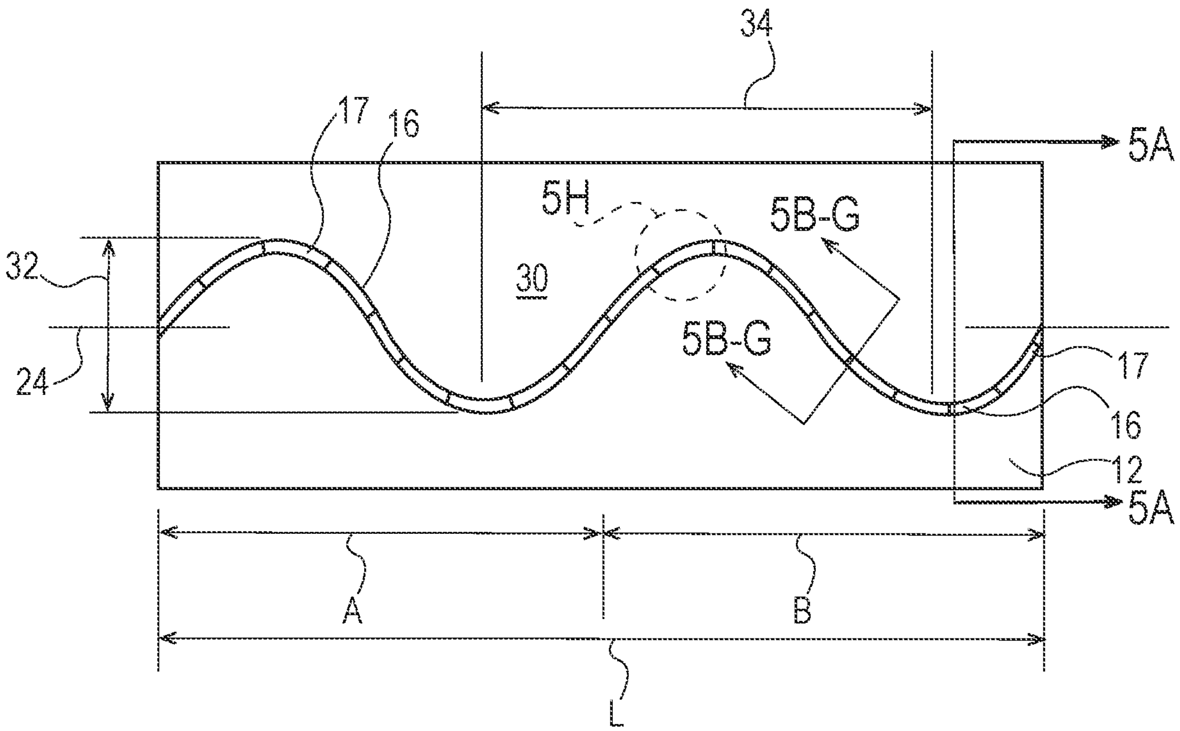
FIG. 5 is a front elevation view of an anvil disposed on a cylinder in accordance with one non-limiting embodiment of the present disclosure.
Figure 5A:
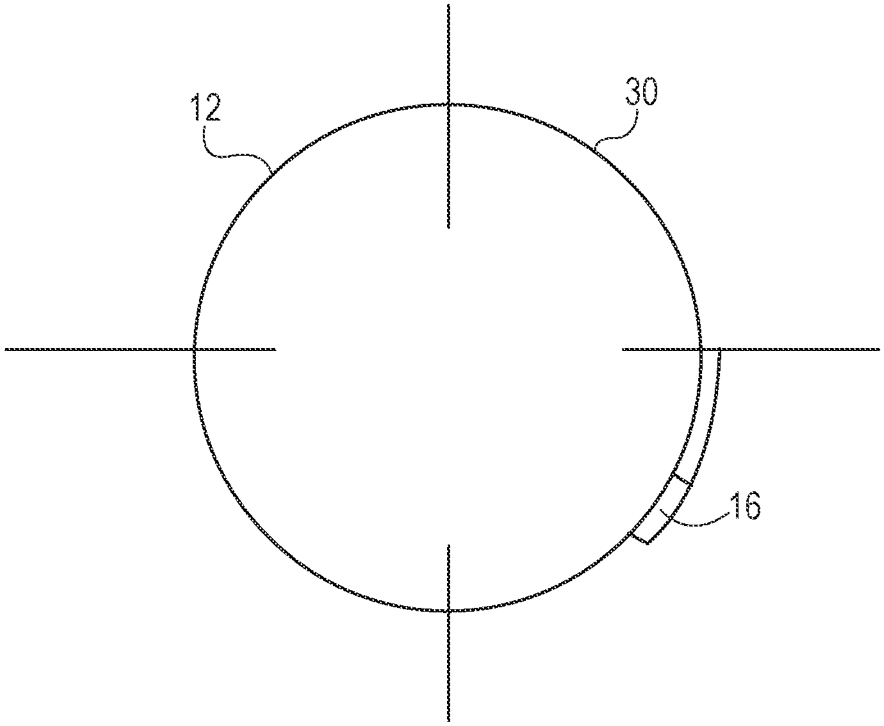
FIG. 5A is a side elevation view of an anvil disposed on a cylinder in accordance with one non-limiting embodiment of the present disclosure.
Figure 5G:
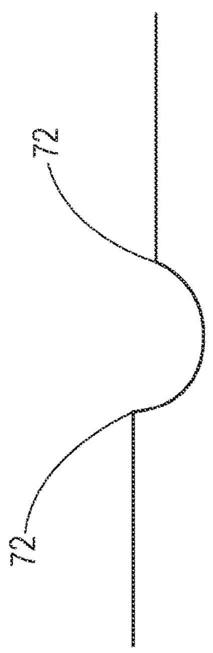
FIGS. 5B-G are a cross sectional view of Section 5B-G of FIG. 5.
Figure 5H:
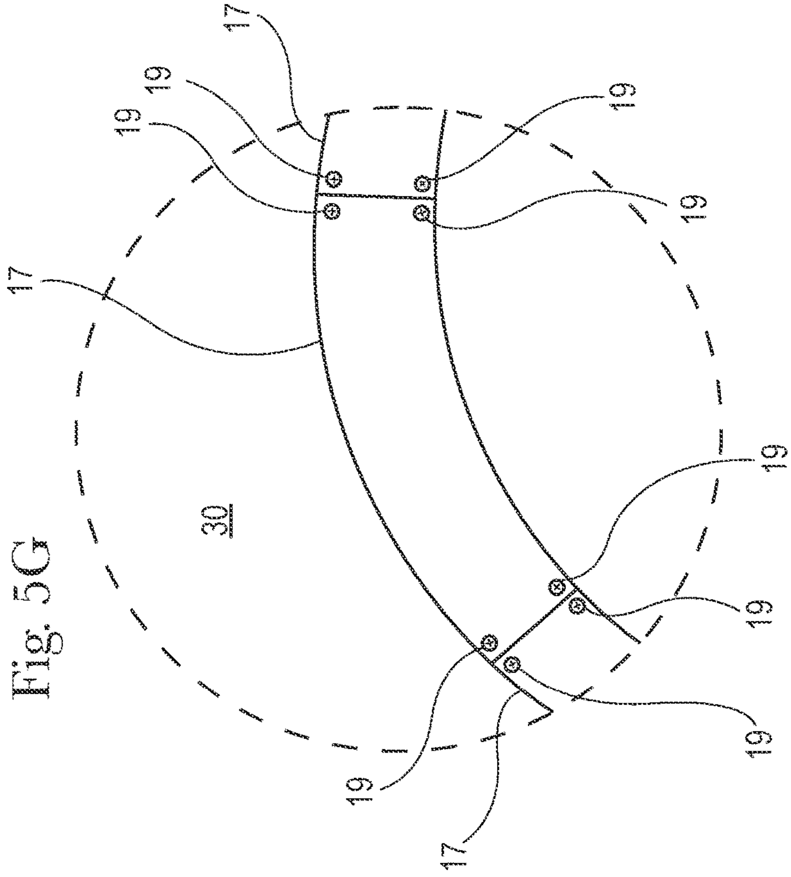
FIG. 5H is an enlarged view of Section 5H of FIG. 5.
Figure 5B:
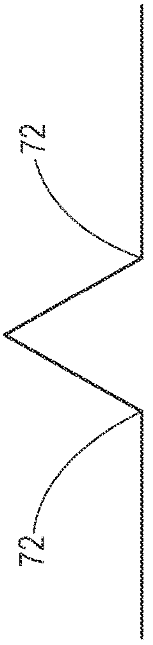
Figure 5C:
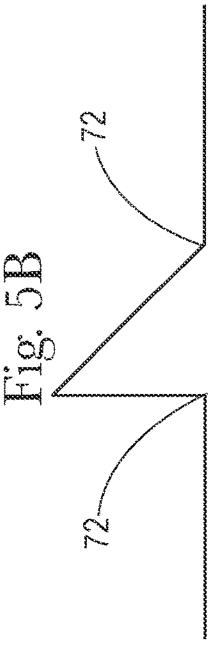

The cylinder 12 can comprise at least one anvil 16 disposed on the outer surface 30, as illustrated in FIGS. 1-5. The anvil 16 can protrude above the outer surface 30, that is extend radially outward from the surface 30. The anvil 16 can be made from one or more of tool steel, carbon steel, aluminum, ceramic, hard plastic or other suitable material. The anvil 16 can be coated with materials to enhance its strength and wear resistance (also referred to as machine life). For example, in one embodiment, the anvil 16 can be subject to plasma-enhanced chemical vapor deposition to deposit a thin film of material on the surface of the anvil 16. Materials that can be used to prolong the machine life of the anvil 16 can include titanium oxide and ceramic coatings. The anvil 16 can be fixed to or removably attached to the outer surface 30. For example, in one embodiment, the outer surface 30 can be machined to form an anvil 16 by effectively removing material from the outer surface 30. In an alternative embodiment, an anvil 16 can be a separate member that can be inserted and removably attached to the cylinder 12, as shown in FIGS. 2, 3, and 5. The anvil 16 can be disposed on an anvil insert 29, which can be removably attached to the outer surface 30 of the cylinder 12. In one embodiment, the anvil 16 can be machined from the surface of the anvil insert 29. In alternative embodiment, the anvil 16 can be removably attached mechanically, such as by bolting, clamping, or screwing, or chemically, such as by adhering to the anvil insert 29.

A removably attached anvil 16 can aid in quickly changing out dull, worn, and/or damaged parts. Further, a removably attached anvil 16 can allow for easily changing from a straight perforation system to a shaped perforation system. In one example embodiment, the cylinder 12 can comprise an anvil 16 comprised of one or more anvil segments 17 positioned end-to-end along the length L of the cylinder 12, as shown in FIG. 5. Each anvil segment 17 can have a length sufficient for interacting with the blade 20 and/or easily removing segments for replacement. Thus, each individual anvil segment 17 can be removed and replaced independent of another anvil segments 17 disposed on the cylinder 12. Each anvil segment 17 can be adjusted on the outer surface of the cylinder 12 to change how the anvil 16 contacts the blade 20 and perforates the web 14. For example, a series of adjustment screws may be used to independently raise or lower the removably attached individual anvil segments 17 to facilitate an overall anvil 16 adjustment. Further, each anvil segment 17 can be positioned independent of another anvil segment 17 such that the blade 20 interacts differently with the different sections creating a line of weakness 21 having a plurality of perforations 22 and bond areas 23 with different characteristics, such as strength and/or size.

In addition to one or more anvil segments 17 being disposed end to end to extend along the length L of the cylinder 12, one or more anvils 16 (each of which can comprise individual anvil segments 17 or a continuous single-piece anvil) can be spaced radially about the outer surface 30, as shown in FIGS. 2-4. The one or more anvils 16 can be spaced radially about the outer surface 30 such that each line of weakness 21 on the web 14 is produced at some desired distance from one another, which can result in a desired sheet length. For example, in one embodiment, a cylinder 12 having a diameter D of about 12 inches can comprise two anvils 16 spaced equidistant to one another around the outer surface 30 of the cylinder 12. A web 14 can be fed through a perforating apparatus 10 comprising the cylinder 12 such that the machine direction MD of the web is substantially perpendicular to the longitudinal cylinder axis 24 of the cylinder 12. In another embodiment, a web 14 can be fed through a perforating apparatus 10 comprising the cylinder 12 such that the machine direction MD of the web is at an angle to the longitudinal cylinder axis 24 of the cylinder 12, which is disclosed in more detail below.

Successive lines of weakness 21 imparted to the web 14 can be spaced at a distance equal to about the circumference of the cylinder 12 divided by the number of anvils 16 spaced equidistant to one another. Stated another way, the spacing of lines of weakness 21 on the web 14 can be about equal to the spacing between each anvil 16 disposed on the outer surface 30 of the cylinder 12. For example, a cylinder 12 comprising nine rows of anvils 16 disposed radially about the outer surface 30 and a desired sheet length of about four inches, the cylinder 12 can have a diameter of about 11.5 inches and a circumference of about 36 inches. In an alternative example embodiment, the distance between one or more anvils 16 disposed about the outer surface 30 can be unequal and, thus, the line of weakness 21 on the web 14 can also spaced at unequal distances one from another, being about equal to the distance between adjacent anvils 16 disposed about the cylinder 12. One of ordinary skill in the art would understand that for the line of weakness 21 on the web 14 to be equal to the distance between the one or more anvils 16, the speed of the web 14 would substantially match the rotational speed of the cylinder 12 and the longitudinal cylinder axis 24 would be substantially perpendicular to the machine direction of the web 14. Likewise, one of ordinary skill in the art would understand that by over-speeding or under-speeding the web 14, the MD spacing between the lines of weakness 21 can be varied with respect to the spacing between anvils 16 on cylinder 12. In another embodiment, the cylinder 12 can be both over-sped and under-sped to produce variable sheet lengths in the web 14. Thus, the cylinder can be run at a constant over-speed, a constant under-speed or variable speeds, both over-speed and under-speed.

The anvil 16 can have any substantially continuous, non-linear shape (also referred to as a curvilinear shape), for example, a sinusoidal shape or saw-tooth shape, as illustrated in FIGS. 1, 5, 6, 7, and 23A-Q. The continuous line segment shape of the anvil 16 is dependent on the desired shape of the line of weakness 21 in the web 14.

Figure 5D:
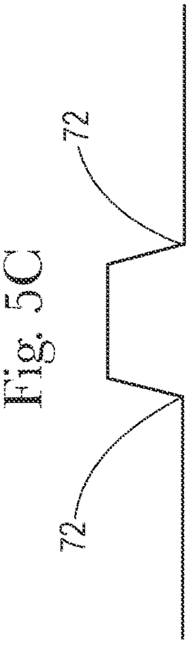
Figure 5E:
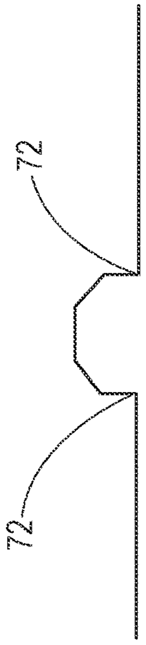
Figure 5F:
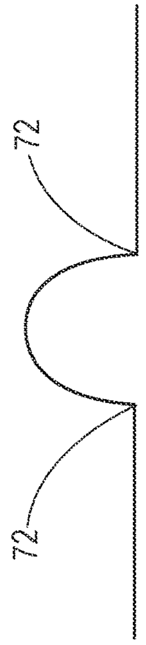

As illustrated in FIGS. 5A-G, the continuous line segment shaped anvil 16 can have a shaped cross section. The anvil 16 can be any non-linear shape that allows the anvil 16 to cooperate in contacting relationship with the blade 20 to impart a line of weakness 21 to a web 14. In one embodiment, the anvil 16 can have a substantially square or rectangular cross section. In another example embodiment, the anvil 16 can have a substantially flat top, as shown in FIGS. 5D and 5E. Similarly, the anvil 16 can have a substantially concave or convex cross section. Still in another embodiment, the anvil 16 can have a substantially triangular cross section. Other cross sections that would allow for the anvil 16 to be in contacting relationship with the blade 20 would be readily discernible to one skilled in the art. Further, the anvil 16 can be designed such that the stresses are minimized at the root 72. For example, in one embodiment, the root 72 can be radiused with a radius of curvature that minimizes stress concentrations. The radius of curvature can range from 0.010 inches to about 1 inch.

Referring to FIG. 5, in one embodiment, the anvil 16 can be a continuous line segment shape that is substantially parallel to or at some angle to (discussed more fully below) the longitudinal cylinder axis 24. The continuous, non-linear shape of the anvil 16 can comprise an amplitude 32, which is the distance measured between a highest point and an adjacent lowest point, opposite the highest point, of a shaped anvil 16 along the outer surface 30 of the cylinder 12. The amplitude 32 can vary between adjacent high points and low points. One or more amplitudes 32 present on the outer surface 30 of the cylinder 12 can be substantially the same or different. Similarly, the anvil 16 can comprise a wavelength 34, which is the distance measured between adjacent crests or adjacent troughs in a repeating portion of the continuous line segment shaped anvil along the outer surface 30 of the cylinder 12. For example, as shown in FIG. 5, the anvil 16 repeats at a first low point and a consecutive low point that defines a distance therebetween being the wavelength 34. In one embodiment, the anvil 16 can comprise less than one repeating portion and, thus, the number of wavelengths 34 would be less than one. In another embodiment, the anvil 16 can comprise more than one wavelength 34. More specifically, for example, as shown in FIG. 5, the anvil 16 can comprise about two wavelengths 34 labeled A and B. The distance of wavelength A can be greater than, less than, or equal to the distance of wavelength B.

The wavelength 34 and amplitude 32 can be selected to minimize or avoid chatter in the perforating apparatus 10. Chatter is the vibration imparted to the perforating apparatus 10 as the blade 20 cooperates in contacting relationship with the anvil 16 at operating speeds. Chatter can be avoided or reduced by minimizing the number of simultaneous interaction points 26 between the anvil 16 and the blade 20. The continuous line segment shape of the anvil 16 can allow for a reduction in the number of interaction points 26 between the anvil 16 and the blade 20. For example, in one embodiment, the anvil 16 can comprise a wave-form shape, as shown in FIG. 5, that is substantially parallel to the longitudinal cylinder axis 24. The shape of the anvil 16 results in a certain number of interaction points 26 as the straight blade 20 passes over the anvil 16. For example, as the blade 20 passing over the anvil 20, as shown in FIG. 5, the blade 20 overlaps the anvil 16 creating interaction points 26 of at most about five points and at least about two points at a given moment in time. Therefore, changing the amplitude 32 and wavelength 34 of an anvil 16 that is substantially parallel to the longitudinal cylinder axis 24 will change the number of interaction points 26 between the anvil 16 and blade 20 at a given moment in time.

One of ordinary skill in the art would understand that the anvil 16 can be designed to impart a desired shape of a line of weakness 21 in the absorbent tissue product. In one embodiment, the anvil 16 can be designed such that the line of weakness 21 on a web 14, such as absorbent sheet product (also referred to as a sanitary tissue product), can have a wavelength 34 from about 10% of the sheet width to about 200% of the sheet width and an amplitude 32 of less than about 50% of the distance between adjacent lines of weakness 21. For example, in one embodiment, the absorbent sheet product can have a width of about 3.5 inches and the distance of the wavelength 34 can be about 50% of the sheet width, which is about 1.75 inches. Thus, the line of weakness 21 imparted to the absorbent sheet product can have at least one wavelength 34. For example, an absorbent sheet product having a distance between adjacent lines of weakness 21 of about 4 inches can comprise a line of weakness 21 having an amplitude 32 of about 2 inches.

Figure 6:
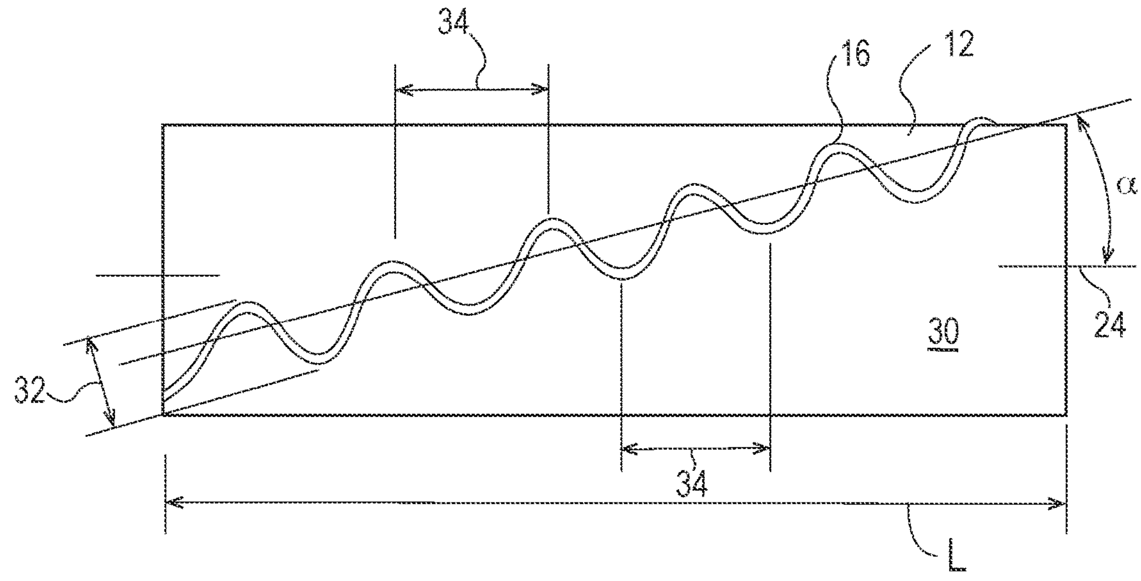
FIG. 6 is a front elevation view of an anvil disposed on cylinder in accordance with one non-limiting embodiment of the present disclosure.
Figure 7:
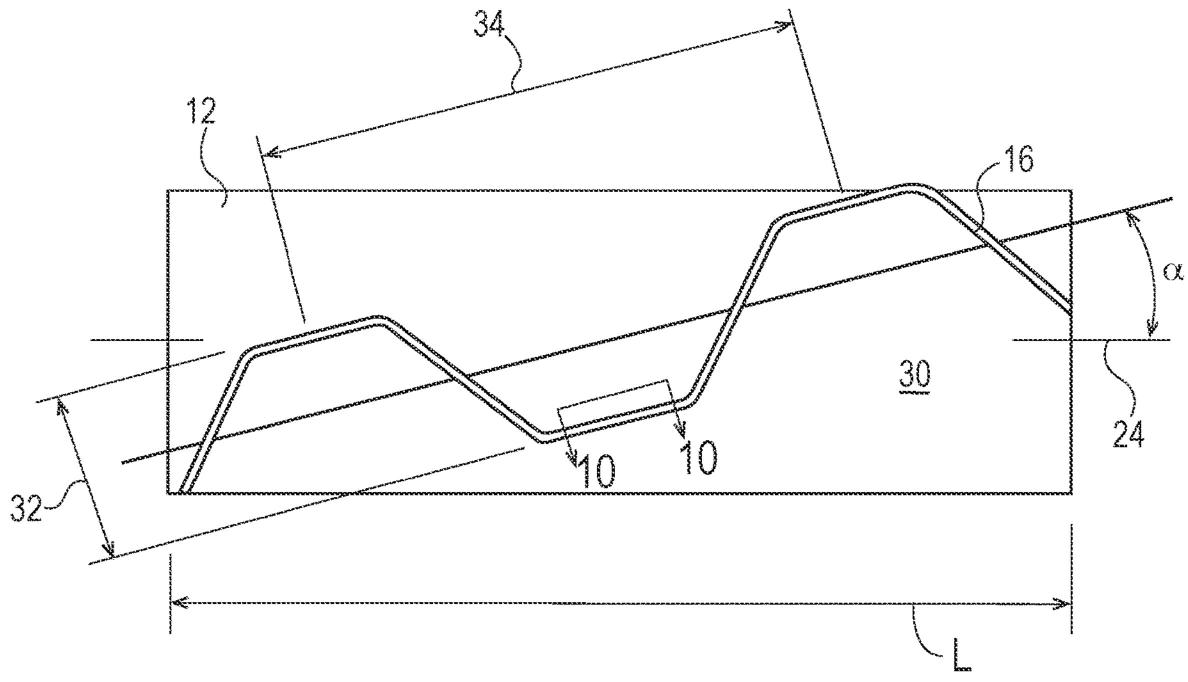
FIG. 7 is a front elevation view of an anvil disposed on cylinder in accordance with one non-limiting embodiment of the present disclosure.

Still further, chatter can be reduced by nesting one or more anvils 16 disposed on the outer surface 30 of the cylinder 12 (not shown). By nesting one or more anvils 16 the blade 20 can remain in constant contact with the anvil 16. Having the blade 20 in constant engagement with the anvil 16 can allow the cylinder 12 to remain balanced and stabilized and, thus, reduce chatter in the perforating apparatus 10. Additionally, other ways to reduce chatter include, for example, positioning the anvil 16 so that it is helixed about the cylinder 12. As illustrated in FIGS. 6 and 7, the anvil 16 can be mounted at an angle with respect to axis 24, such that it extends in a helical orientation on the outside surface 30 of the cylinder 12. The anvil 16 can be at an angle α to the longitudinal cylinder axis 24 of from greater than 0 degrees to about 45 degrees and/or from about 2 degrees to about 20 degrees and/or from about 4 degrees to about 8 degrees. When used with a blade 20 positioned substantially parallel to cylinder axis 24, the helically mounted anvil 16 can reduce the number of simultaneous interaction points 26 at a given period in time between the anvil 16 and the blade 20. In one embodiment, the helically mounted shaped anvil 16 results in cooperation between the anvil 16 and blade 20 such that there less simultaneous interaction points 26 than a similar non-helixed anvil 16.

Figure 8:
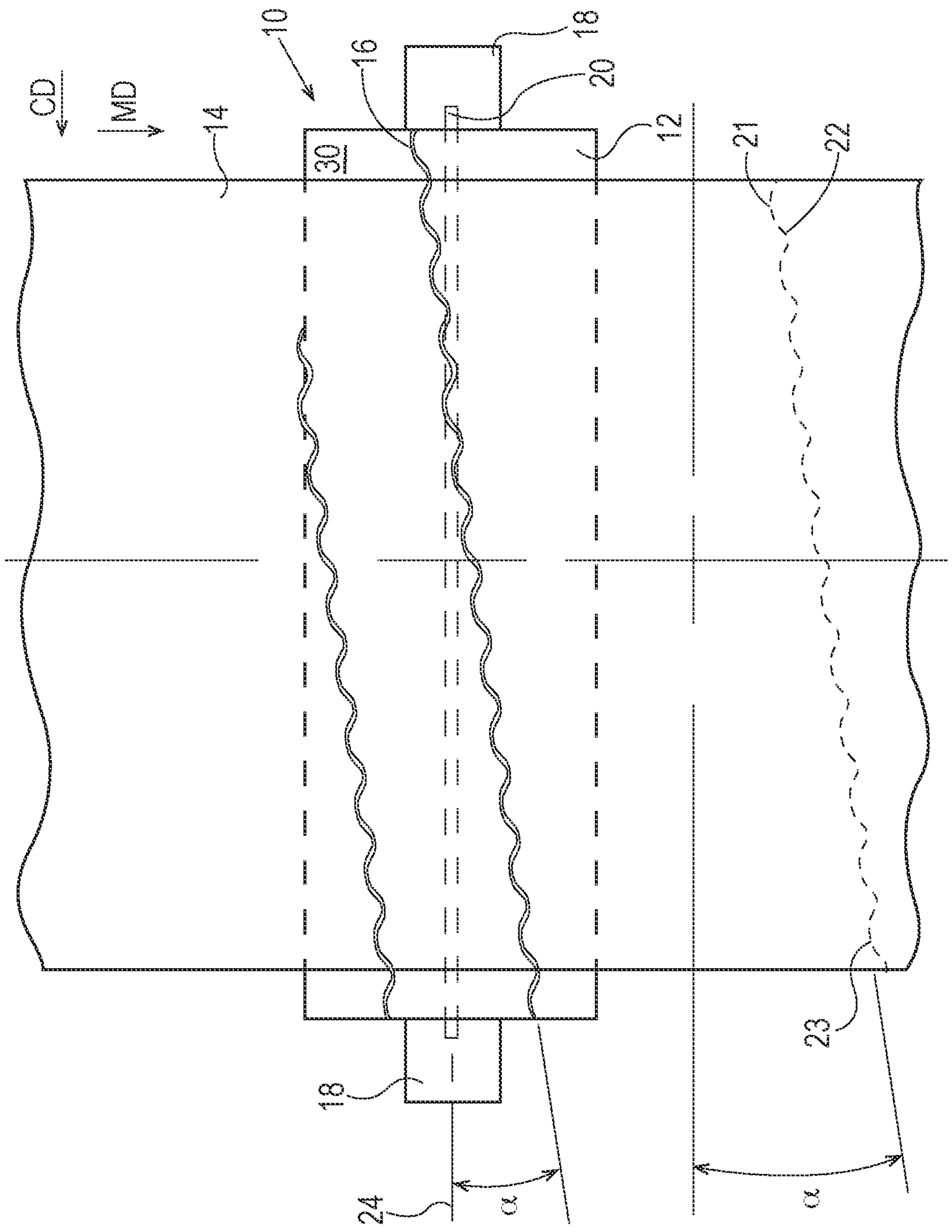
FIG. 8 is a plan view of a web in position to be perforated by a perforating apparatus in accordance with one non-limiting embodiment of the present disclosure.

In one example embodiment, each perforation 22 in the line of weakness 21 can be formed one at a time as the anvil 16 interacts with the straight blade 20 at a single location at a given moment in time. By helically mounting the anvil 16, the blade 20 operatively engages the anvil 16 at minimal interaction points 26. For example, the blade 20 can engage the helical anvil 16 such that the perforations 22 are created by a consecutive series of minimized interaction points 26 across the entire web 14 in a zipper-like manner. Further, helically mounting the anvil 16 can allow the anvil 16 to be in constant engagement with the blade 20. Stated another way, by helically mounting one or more anvils 16 about the outer surface 30 of by the cylinder 12 a portion or point of the anvil 16 can always be in contact with a portion or point of the blade 20, as illustrated in FIG. 8. In one embodiment, the blade 20 can have almost traversed one anvil 16 such that substantially the entire line of weakness 21 has been imparted to the web 14 while almost simultaneously encountering a subsequent anvil 16, such that the creation of the line of weakness 21 in the web 14 is just beginning. Having the blade 20 in constant engagement with the anvil 16 can allow the cylinder 12 to remain balanced and stabilized and, thus, reduce chatter in the perforating apparatus 10.

However, helically mounting the anvil 16 about the cylinder 12 and running the web 14 at matched speed to the cylinder 12, can result in the line of weakness 21 being at an angle to the CD, as illustrated in FIG. 8. The angle of the helixed anvil 16 to the longitudinal cylinder axis 24, angle α, can be substantially the same angle of the line of weakness 21 to the cross machine direction, CD. To compensate for the angle in the line of weakness 21, the web 14 can be run at a speed slower than the cylinder 12. By running the web 14 slower than the rotating cylinder 12, the web 14 can move a lesser distance before each subsequent perforation 22 is imparted to the web 14. However, there are limitations as to how fast or how slow the cylinder 12 can be sped with respect to the web 14.

Figure 9:
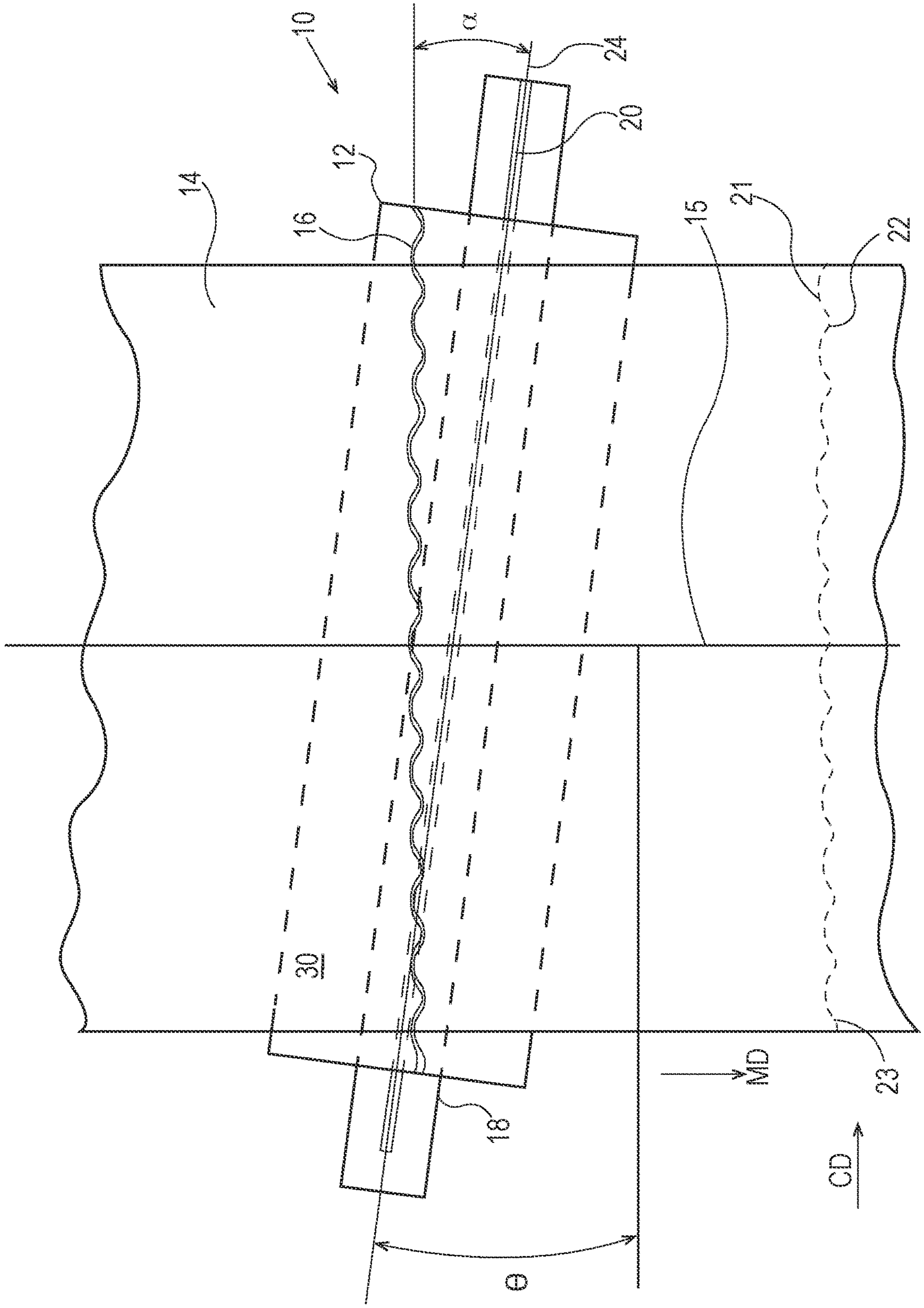
FIG. 9 is a plan view of a web in position to be perforated by a perforating apparatus in accordance with one non-limiting embodiment of the present disclosure.

The perforating apparatus 10 can also be skewed with respect to the web 14 to correct for an angle in the line of weakness 21 with respect to the CD, as shown in FIG. 9. Thus, the angle of the perforating apparatus 10 with respect to the web 14 allows a line of weakness 21 that is substantially parallel to the CD to be imparted to the web 14 despite the helically mounted anvil 12. More specifically, as disclosed above, the anvil 16 can be helixed at some angle α with respect to the longitudinal cylinder axis 24. The cylinder 12 comprising the anvil 16 and the support 18 comprising the blade 20 can be skewed by some angle θ with respect to the CD of the web 14. The cylinder 12 and the blade 20 are skewed relative to one another such that the longitudinal cylinder axis 24 is substantially parallel to the blade 20. The angle θ can be equal to about the angle α. The angle θ can be greater than or less than about the angle α. In one example embodiment, the angle θ can be from 0 degrees to about 45 degrees and/or from about 2 degrees to about 20 degrees and/or from about 4 degrees to about 8 degrees.

Where the web 14 is skewed with respect to the perforating apparatus 10, the web 14 may experience a force vector that drives the web 14 off of a desired path as the web 14 is exiting the perforating apparatus 10. In other words, the web 14 may travel at an angle out of the perforating apparatus 10 as opposed to following a desirable straight line path 15. Wrapping the web 14 about one or more idlers may reduce the web 14 likelihood to travel at an undesirable angle. In one nonlimiting example, an idler is placed upstream of the cylinder 12 and/or upstream of blade 20. In another nonlimiting example, an idler is placed downstream of the cylinder 12 and/or downstream of the blade 20. The idler may be wrapped with sandpaper, such as 60-grit sandpaper or 120-grit sandpaper. In another embodiment, the idler can be provided with a means to increase the coefficient of friction on its surface.

Figure 10:
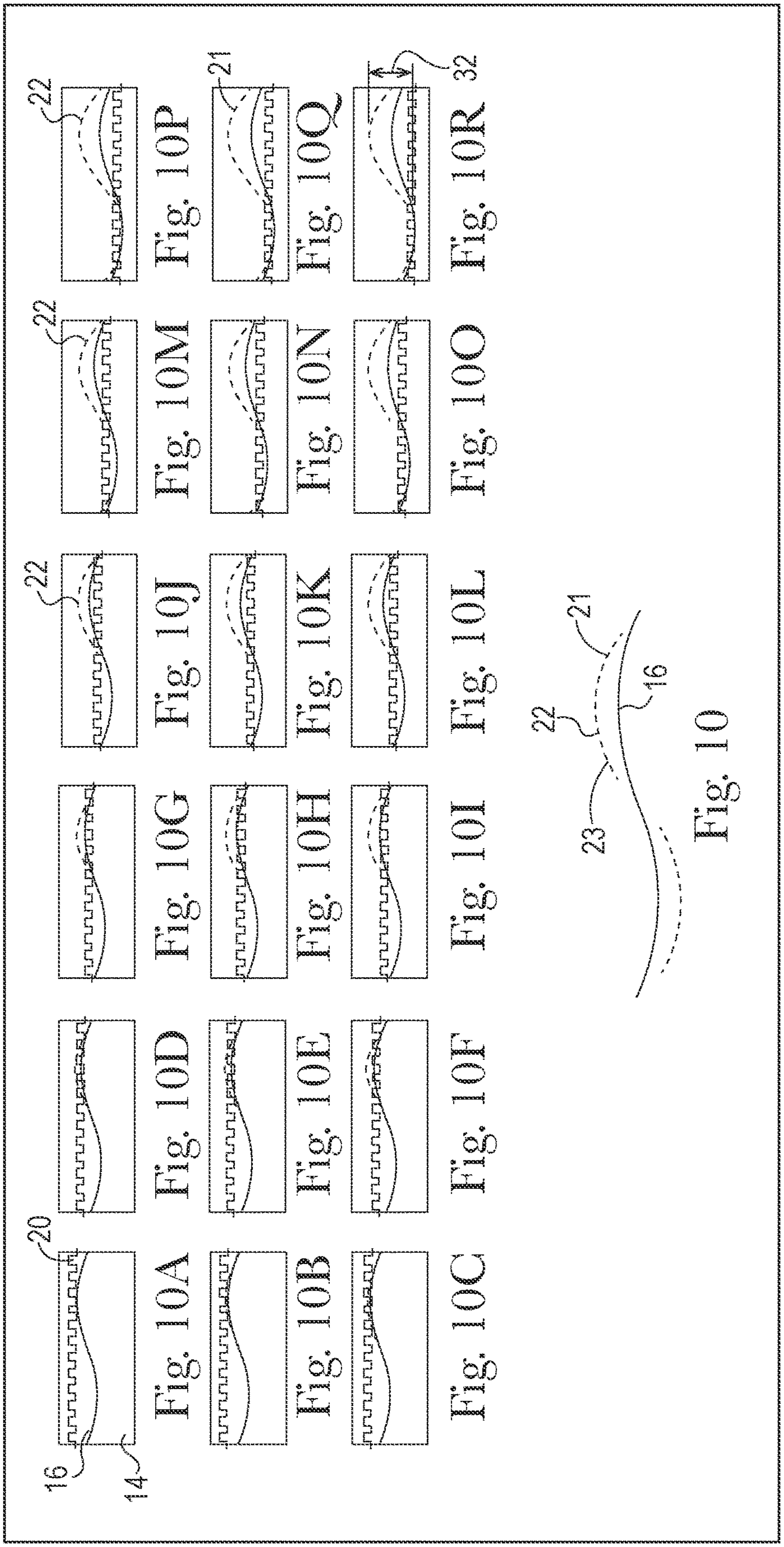
FIG. 10 is a schematic representation of a shape of a line of weakness and a shape of an anvil.

Further to the above, the characteristics of the line of weakness 21 on the web 14 can be changed by over-speeding or under-speeding the web 14 and/or the cylinder 12 comprising the shaped anvil 16. As illustrated in FIG. 10, the shape of the line of weakness 21 on the web 14 can change when over-speeding the web 14 with respect to the rotating cylinder 12, which is also referred to as under-speeding the rotating cylinder 12 with respect to the speed of the web 12. When the web 14 moves at a faster speed than the rotating cylinder 12, the line of weakness 21 can become distorted as compared to the shape of the anvil 16. For example, a web 14 moving at a faster speed than the cylinder 12 through the interaction point 26 can have an increased amplitude 32 as shown in FIG. 10R. FIGS. 10A-10R illustrate how perforations 22 can be imparted to a web 14 running at an over-speed. Thus, FIG. 10A depicts the first interaction point 26 of the anvil 16 to the blade 20 creating a perforation 22, FIGS. 10B through 10Q depict the progression of the web 14 and the perforations 22 imparted to the web 14, and FIG. 10R shows the final interaction point 26 of the anvil 16 and the blade 20 creating the final perforation 22 in the web 14.

One of ordinary skill in the art would understand that by over-speeding the cylinder 12 with respect to the web 14, the line of weakness 21 would again become distorted as compared to the shape of the anvil 16. For example, by over-speeding the cylinder 12 with respect to the web 14, the amplitude 32 of the line of weakness 21 will become shorter than the amplitude of the shaped anvil 16. Thus, the design of the shaped anvil 16 disposed on the cylinder 12 should be taken into consideration to produce the desired line of weakness 21 when over-speeding or under-speeding the web 14 or the cylinder 12.

Further, the web 14 can be perforated while under tension in the machine direction MD. The tension on the web 14 in the MD results in the web 14 becoming elongated in the MD and narrower in the cross machine direction CD. This phenomena of elongation in the MD and narrowing in the CD is referred to as neck-down. For a web 14 under tension in the MD and narrowed in the CD as it is passed through the perforating apparatus 10, the line of weakness 21 imparted to the web 14 on the final rolled absorbent product can be different than the profile of the shaped anvil 16 disposed on the rotating cylinder 12 and/or the shaped line of weakness 21 imparted to the web 14 just after passing through the perforating apparatus 10. Once the web 14 is wound onto a final rolled absorbent product and is no longer under the same tension as when perforated, the web 14 can return to its original, non-tensioned dimensions. More specifically, the web 14 in the MD can contract back and the web 14 in the CD can become wider. The shaped line of weakness 21 imparted to the web 14 undergoes a similar transformation once the tension in the web 14 is lessened or removed. In one example embodiment, a curvilinear line of weakness 21 on the final rolled absorbent product, which was perforated under tension and is now no longer under tension, can have an amplitude that is less than the amplitude imparted when the web 14 was under tension just after passing through the perforating apparatus 10, and an increased wavelength distance as compared to the distance of the wavelength of the web 14 under tension after just passing through the perforating apparatus 10. Thus, the shape of the anvil 16 disposed on the rotating cylinder 12 can be designed to account for the tension, if any, in the web 14 so as to produce the desired curvilinear shape in the line of weakness 21 of the final rolled absorbent product.

Figure 11:
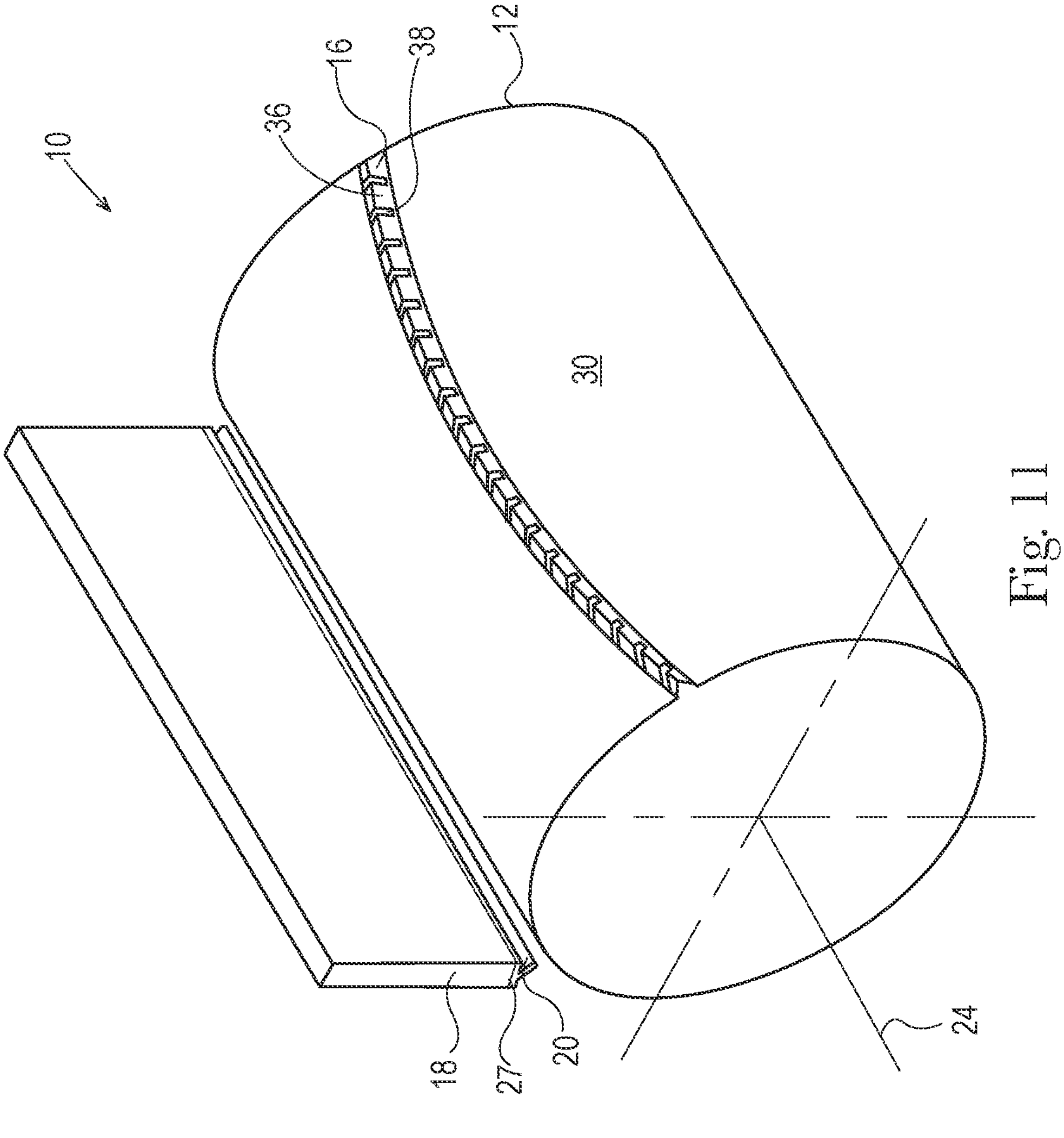
FIG. 11 is a perspective view of a perforating apparatus in accordance with one non-limiting embodiment of the present disclosure.
Figure 12:
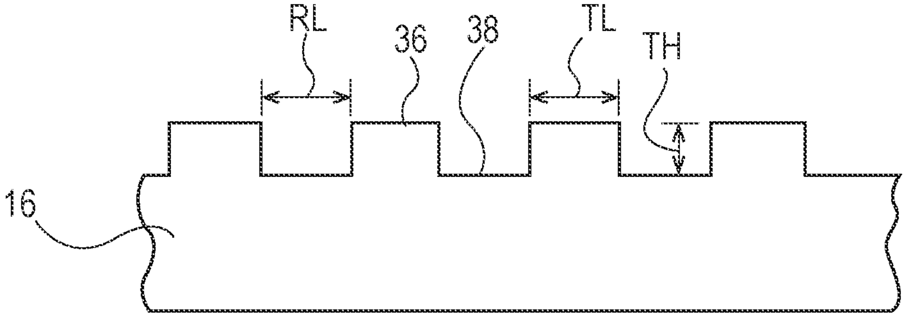
FIG. 12 is a schematic representation of a notched anvil in accordance with one non-limiting embodiment of the present disclosure.

In yet another embodiment, the anvil 16 can be smooth-edged or notched, as shown in FIGS. 6 and 11, respectively. As illustrated in FIGS. 11 and 12, a notched anvil 16 can comprise a plurality of teeth 36 and one or more recessed portions 38. Each adjacent tooth can be separated by a recessed portion 38. The one or more teeth 36 and/or recessed portions 38 can be machined into the anvil 16 or removably attached to the anvil 16. Referring to FIG. 12, each tooth 36 can have a length TL and a height TH and each recessed portion 38 can have a length RL. Each recessed portion 38 can be separated by an adjacent tooth length TL. The tooth height TH can be designed to obtain the desired perforation characteristics. In one example embodiment, the tooth height TH can be from about 0.005 inches to about 0.500 inches, including every 0.001 inches therebetween. The tooth length TL is dependent upon the desired size of perforation. Stated another way, the spacing of the one or more teeth 36 and one or more recessed portions 38 determines the spacing of each perforation 22 and bond area 23 along the line of weakness 21. Thus, the spacing of the one or more notches 36 and one or more recessed portions 38 can be such that evenly spaced perforations 22 are produced in the web 14 despite the shape of the anvil 16. This will be discussed in greater detail below. Alternatively, the anvil 16 can comprise a smooth-edge or non-notched edge, as shown in FIG. 1. Generally, if the anvil 16 comprises a plurality of teeth 36, the blade 20 can comprise a smooth-edge or non-notched edge, as shown in FIG. 11. Likewise, if the anvil 16 is smooth-edged, that is contains no teeth, the blade 20 can comprise a plurality of teeth 36.

Figure 13:
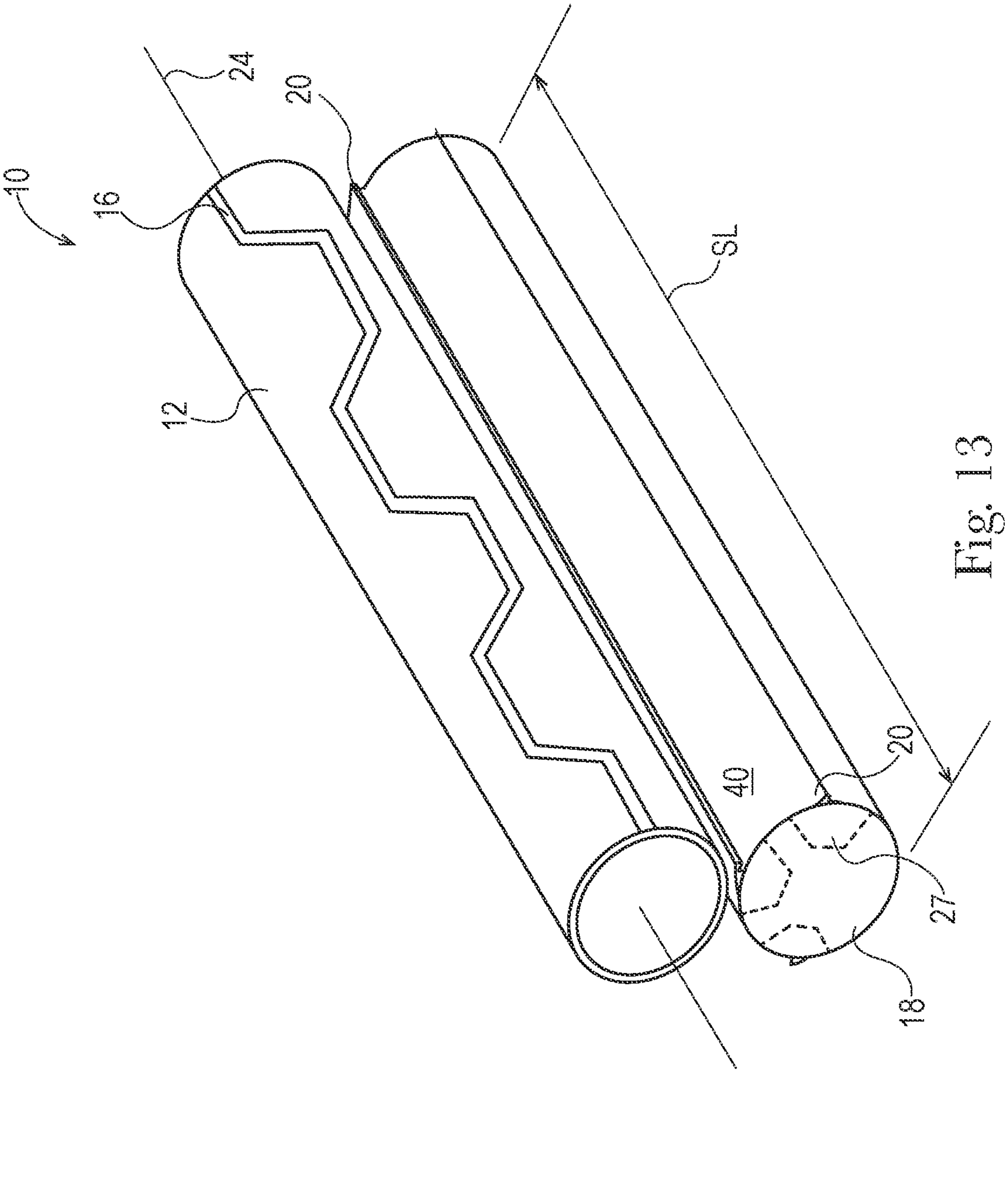
FIG. 13 is a perspective view of a perforating apparatus in accordance with one non-limiting embodiment of the present disclosure.

As discussed above, the support 18, as shown in FIGS. 1 and 2, can comprise a support surface 40 and a blade 20 disposed thereon. The support 18 can be formed from metal, such as steel or a steel alloy, or from some other material as would be known to those skilled in the art to be suitable as a structural support of perforating equipment. The support 18 can be in a block shape, as illustrated in FIG. 2, a cylindrical shape, as illustrated in FIG. 13, or another shape that would adequately support a blade 20. The support 18 can be placed in a fixed, non-moveable, non-rotatable position during contacting relationship with the anvil 16, independent of the shape of the support 18. In one example embodiment, the support 18 can be a cylindrical shape or a substantially square shape such that when one or more blades 20 disposed on the outer surface wear or break, the support 18 can be rotated and fixed in a position so that a new blade 20 can be placed in contacting relationship with the anvil 16. Alternatively, the support 18 can be rotated and/or adjusted in and out of contacting relationship with the anvil 16 to easily and readily replace worn or damaged blades 20.

Figure 14:
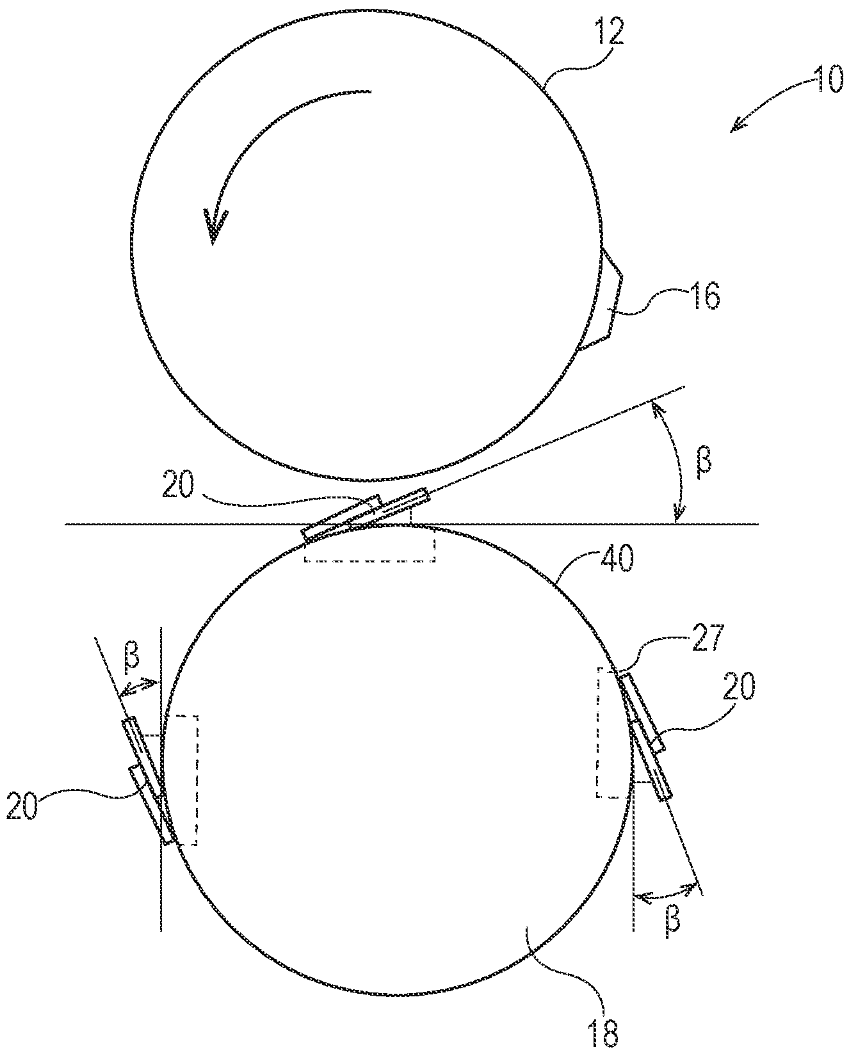
FIG. 14 is a partial side elevation view of a perforating apparatus in accordance with one non-limiting embodiment of the present disclosure.
Figure 15:
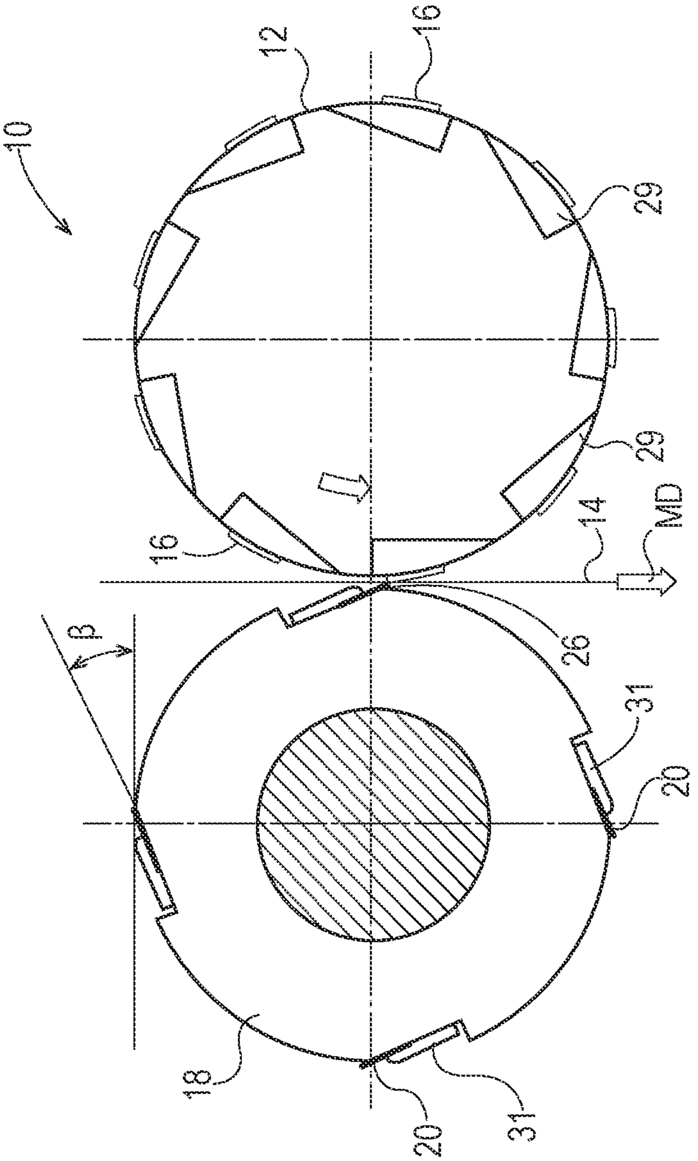
FIG. 15 is a partial side elevation view of a perforating apparatus in accordance with one non-limiting embodiment of the present disclosure.

One or more blades 20 can be disposed around the support surface 40, as shown in FIGS. 1, 14, and 15. Having more than one blade 20 disposed about the support surface 40 can allow for quick change out of worn or damaged blades by indexing or rotating the support surface such that a new blade engages with the anvil 16. Additionally, having more than one blade 20 can allow for quickly changing to different blade orientations or configurations leading to different line of weakness 21 characteristics, such as different shapes, and different individual perforations 22 characteristics, such as length, in the web 14. For example, the width and length of one blade disposed about the support surface 40 can be different than the length of an adjacent blade 20 disposed about the same support surface 40.

Still referring to FIGS. 14 and 15, the blade 20 can be removably secured to the support 18. The blade 20 can be adjusted on the support 18 to be adequately positioned to engage with the anvil 16. The blade 20 can be positioned substantially parallel to the longitudinal cylinder axis 24. The blade 20 disposed on the support 18 can be substantially parallel to or substantially perpendicular to a support surface 40. Alternatively, the blade 20 can be at some angle β to the support surface 40. The angle β can be from about 20 degrees to about 160 degrees and/or from about 20 degrees to about 110 degrees and/or from about 23 degrees to about 90 degrees and/or about 25 degrees to about 60 degrees, and/or about 20 degrees to about 26 degrees, for each range including every 0.1 degree therebetween. It is believed that the lower the angle β, the higher the degree of flexibility when operating the apparatus 10. More specifically, the perforating apparatus 10 is less sensitive to changes in the distance between the cylinder 12 and the support surface 40 when the angle β is lower. For instance, where β is 35 degrees, a change in the distance between the support surface 40 and the cylinder 12 by just a couple of thousandths of inches could result in uneven, ripped or otherwise inadequate perforations 22. On the other hand, where β is 21 degrees, the distance between the support surface 40 and the cylinder 12 can be adjusted by thousandths of inches without perforation 22 quality issues. Indeed, the instance of β being 21 degrees permits an adjustment range (i.e., adjusting the distance between the support surface 40 and the cylinder 12 with perforation 22 quality issues) of about two times, or about three times or about four times more than the adjustment range when β is 35 degrees. Further, the lower the angle β, the less stress applied to the blade 20.

In one embodiment, the blade 20 can be in a cantilevered position. The cantilevered position can allow for the blade 20 to flex at or near its distal end. More specifically, as the anvil 16 cooperates with the blade 20, the distal end of the perforating blade flexes against the anvil 16 to create the line of weakness 21 in the web 14. The blade 20 can be made of tungsten carbide or other suitable material and is commercially available from The Kinetic Company. The blade 20 can be coated with materials to enhance its strength and wear resistance (also referred to as machine life). For example, in one embodiment, the blade 20 can be subject to plasma-enhanced chemical vapor deposition to deposit a thin film of material on the surface of the blade 20. Materials that can be used to prolong the machine life of the blade 20 can include titanium oxide and ceramic coatings. Generally, the anvil 16 is a substantially hardened surface that does not flex or minimally flexes when in contacting engagement with the blade 20.

Figure 16:
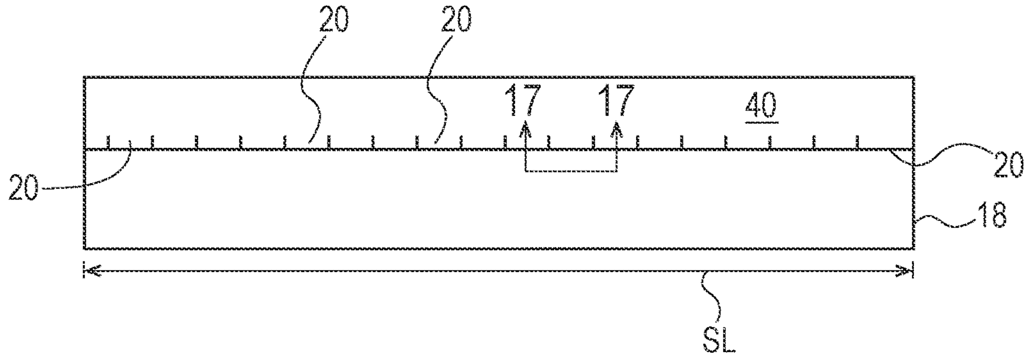
FIG. 16 is a front elevation view of a blade disposed on a support in accordance with one non-limiting embodiment of the present disclosure.

As previously disclosed, the support 18 can be in any orientation with respect to the cylinder 12 that allows the blade 20 and anvil 16 to cooperate in contacting relationship to impart one or more perforations 22 onto the web 14, as shown in FIG. 15. Also shown in FIG. 15, the web 14 progresses in the MD, which is also the direction of rotation of the cylinder 12. Further, the support 18 can comprise a blade 20 that can be made up of a single-continuous blade or a plurality of blade segments extending in an end-to-end relationship across the length SL of the support 18, as illustrated in FIGS. 13 and 16 respectively. That is, a support 18 can comprise a plurality of blade segments 20 that abut one another in length-wise fashion to act similar to a continuous blade. Alternatively, the plurality of blade segments 20 can be spaced such that at least one blade 20 is not in contact with an adjacent blade 20. Still further, the plurality of blade segments 20 can be spaced such that no one blade 20 is in contact with another blade 20 across the length SL of the support 18.

Figure 17:
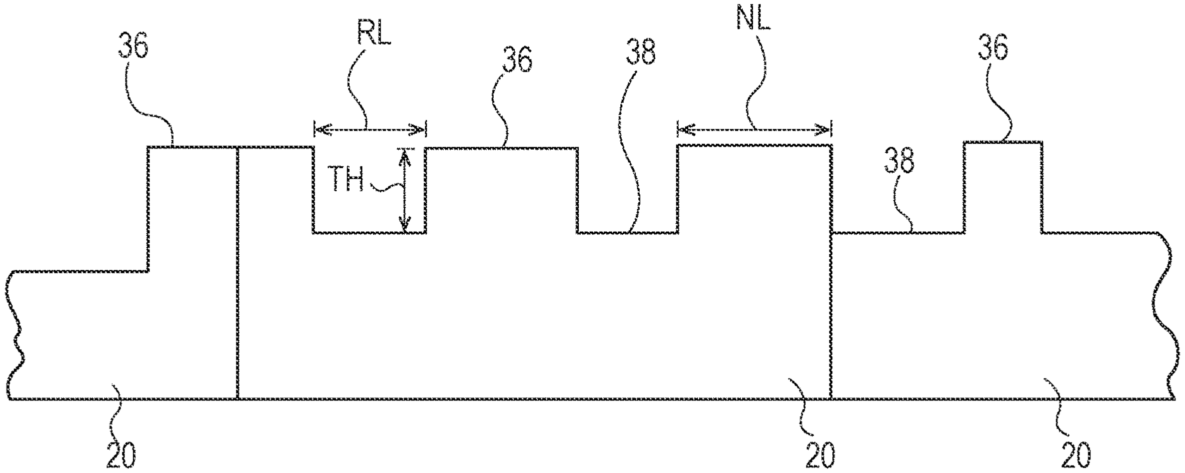
FIG. 17 is a cross sectional view of Section 17-17 of FIG. 16.
Figure 18:
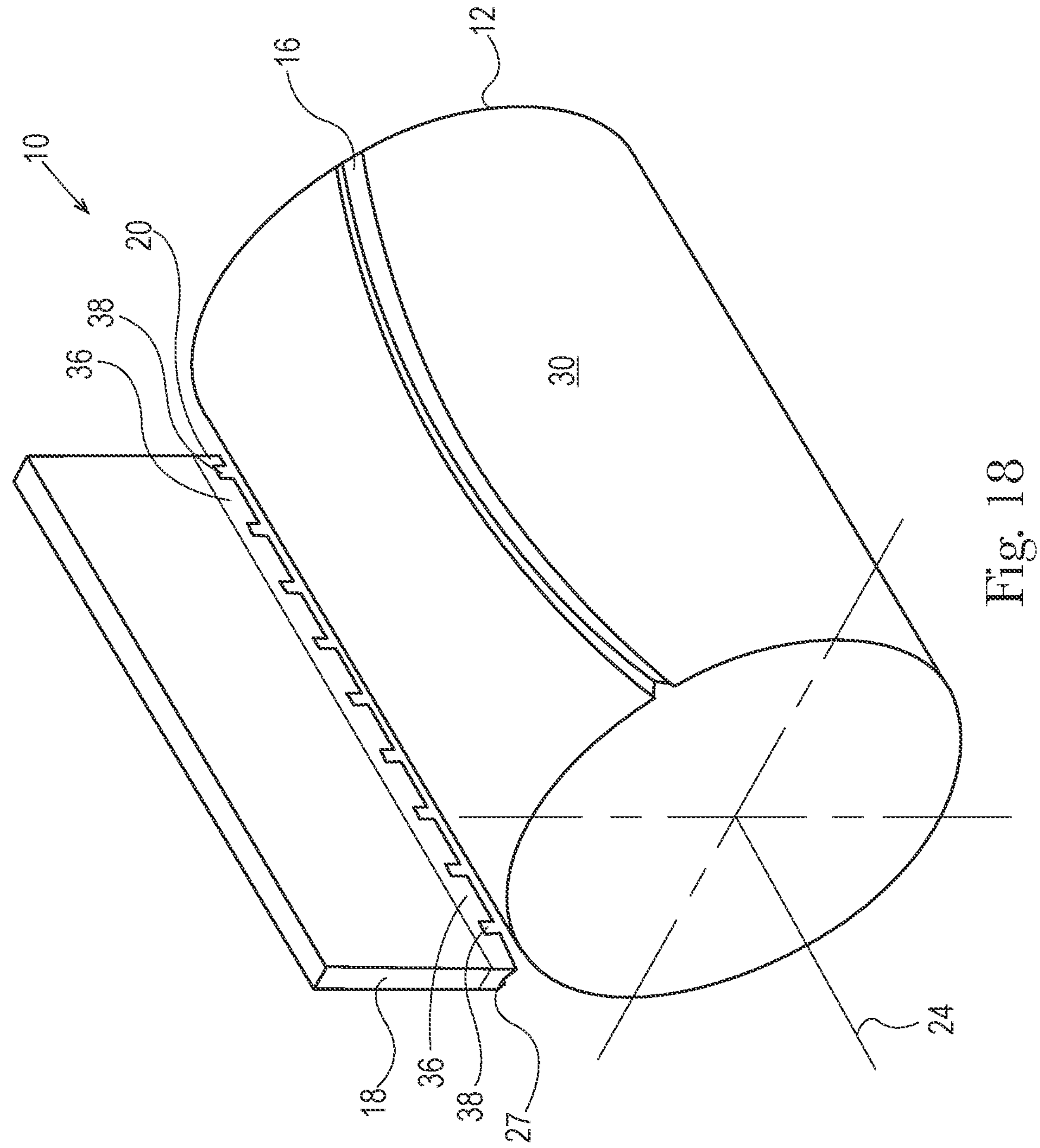
FIG. 18 is a perspective schematic representation of a perforating apparatus in accordance with one non-limiting embodiment of the present disclosure.

As illustrated in FIGS. 17 and 18, the blade 20 can comprise a plurality of teeth 36 and one or more recessed portions 38. The plurality of teeth 36 and/or recessed portions 38 can be machined into the blade 20, or one or more blades 20 can be assembled to produce one or more recessed portions 38 and one or more teeth 36. As previously disclosed, each tooth 36 can have a length TL and a height TH and each recessed portion 38 can have a length RL. Each recessed portion 38 can be separated by an adjacent notch length NL. The tooth height TH can be designed to obtain the desired perforation characteristics. In one embodiment, the tooth height TH can be from about 0.005 inches to about 0.500 inches, including every 0.001 inches therebetween. Further, the spacing of the one or more teeth 36 and one or more recessed portions 38 can relate to the spacing of each perforation 22 and bond area 23 along the line of weakness 21 in the web 14. Thus, the spacing of the one or more teeth 36 and one or more recessed portions 38 can be such that evenly spaced perforations 22 are produced across the line of weakness 21 in the web 14. This will be discussed in greater detail below. Alternatively, or in addition to a notched blade 20, the blade 20 can comprise a smooth-edge, as shown in FIG. 13. Generally, a notched blade 20 cooperates in contacting relationship with a smooth-edge anvil 16, as shown in FIG. 18.

Figure 19:
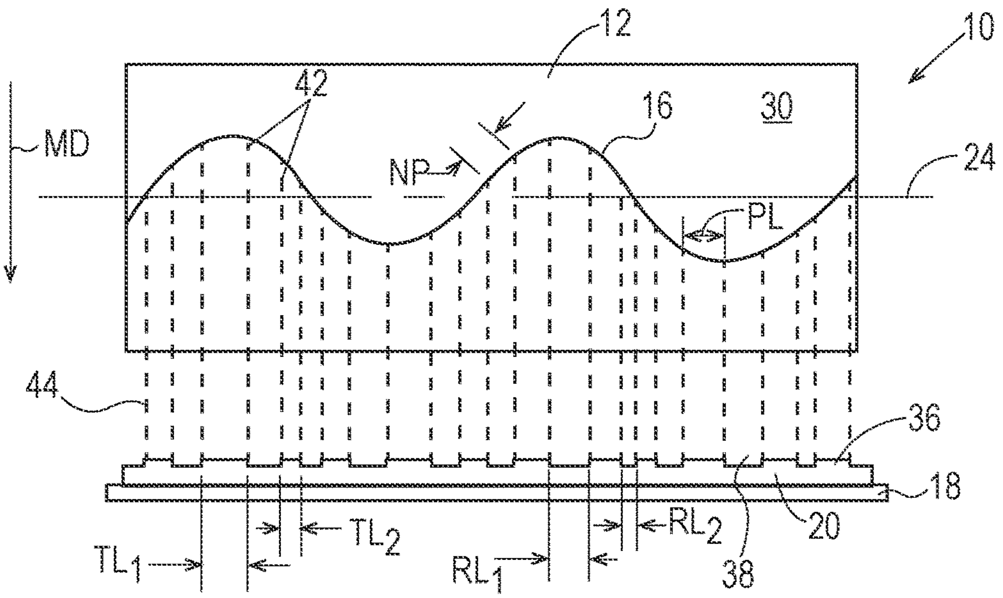
FIG. 19 is a schematic representation of a notched blade disposed on a support and a shaped anvil disposed in a cylinder in accordance with one non-limiting embodiment of the present disclosure.
Figure 22:
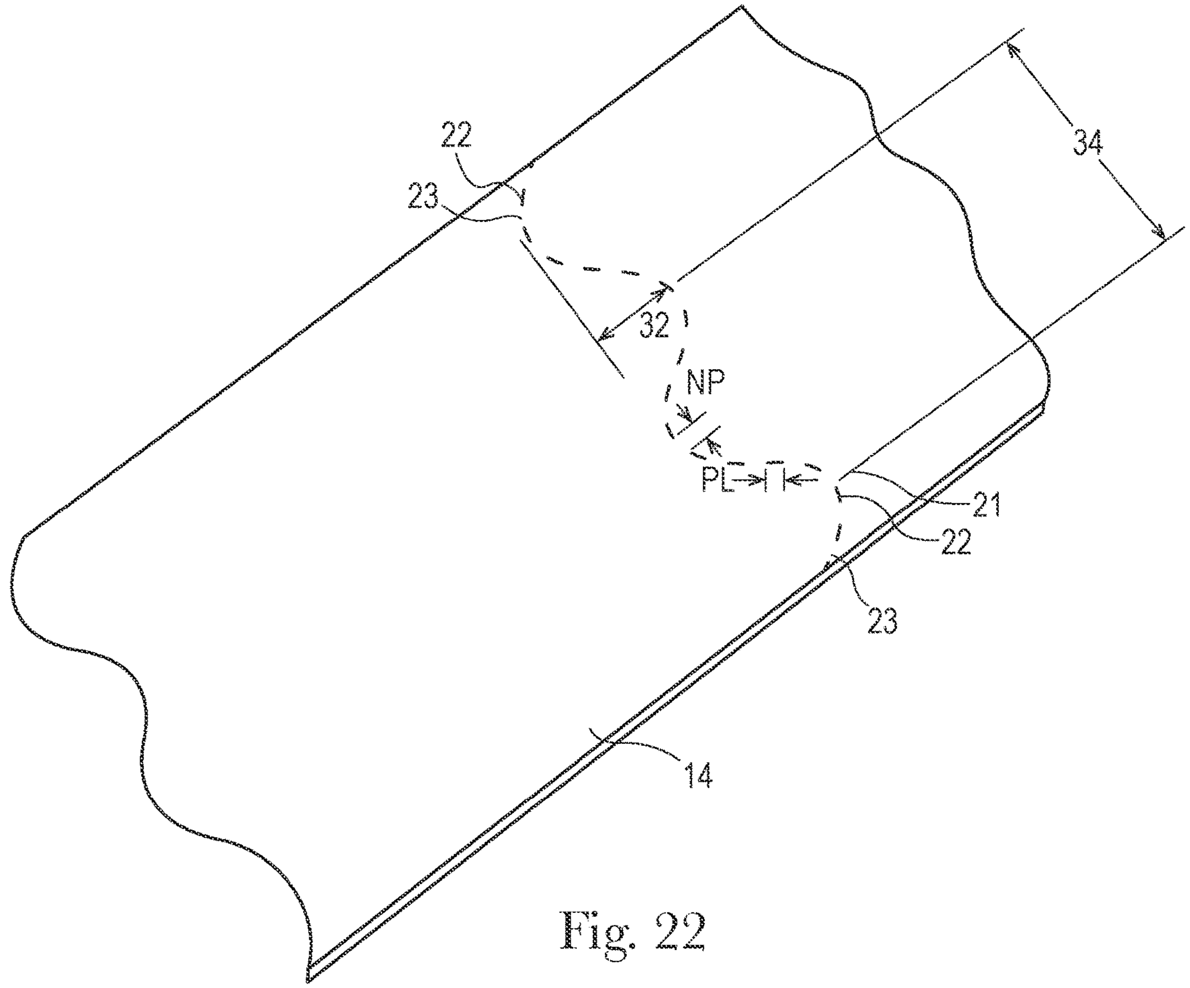
FIG. 22 is a perspective view of a web in accordance with one non-limiting embodiment of the present disclosure.

Referring now to FIG. 19, as can be understood by considering the present disclosure, a blade 20 and/or an anvil 16 can comprise one or more teeth 36 and one or more recessed portions 38 for making a line of weakness 21 comprising one or more perforations 22 and bond areas 23 in the web 14. In one embodiment, the blade 20 disposed on the support 18 comprises one or more teeth 36 and one or more recessed portions 38, and the cylinder 12 comprises an anvil 16 in a wave-form shape. Due to the wave-form shape of the anvil 16, the rotation of the anvil 16 toward the blade 20, and the length of the one or more teeth 36 and the one or more recessed portions 38, a certain perforation length PL, as shown in FIGS. 19 and 22, can be imparted to the web 14. For example, in one embodiment, the length of the one or more teeth 36 and the one or more recessed portions 38 are uniform in length. The uniform length of the one or more notches 36 and the one or more recessed portions 38 can result in non-uniform perforation lengths PL due to the curvilinear shape of the anvil 16. By "uniform" is meant that the lengths are substantially equal or within about 15% or less of each other. By "non-uniform" is meant that two or more lengths are not equal or are greater than about 15% of one another.

Therefore, in one embodiment, a perforating apparatus 10 can be designed to make a line of weakness 21 comprising one or more perforations 22 having a substantially uniform perforation length PL. Alternatively, or in addition to uniform perforation lengths PL, the space between each perforation 22, the bond area 23 can have a non-perforation length NP, where the NP can be substantially uniform. As previously disclosed with respect to FIG. 1, the perforating apparatus 10 can comprise a cylinder 12 that rotates about a longitudinal cylinder axis 24 and a fixed support 18 between which a web 14 is advanced in the machine direction MD. More specifically, a wave-form shaped anvil 16 disposed on the cylinder 12 rotates and engages in contacting relationship with a straight, notched blade 20 disposed on the fixed support 18.

Referring to FIG. 19, the anvil 16 is depicted schematically as a continuous line, but can be any size fit for the cylinder 12 of a perforating apparatus 10, and can be made up of a plurality of individual anvil segments disposed on the cylinder 12 to form a shaped line of weakness 21 in the web 14. The wave-form (also referred to as shaped or curvilinear or nonlinear) shape of the anvil 16 can be primarily dependent on the desired shape of the line of weakness 21 in the finished web 14. The blade is schematically depicted as a straight piece comprising one or more teeth 36 and one or more recessed portions 38 with variable lengths. As stated above, the blade and anvil 16 cooperate in contacting relationship to perforate the web. Still referring to FIG. 19, each tooth 36 has a length TL and can be separated by a recessed portion 38 that also has a length RL. The hash marks 42 on the anvil 16 indicate the end positions of each tooth 36 based on the tooth length TL. Further, dashed lines 44 connect the hash mark 42 corresponding to each tooth 36 and, more specifically, the end positions of each tooth 36. If a uniform perforation length PL is desired, the tooth length TL and corresponding recessed length RL must account for the shape of the anvil 16. As shown in FIG. 19, the hash marks 42 placed along the anvil 16 can be such that a uniform line of weakness is imparted to the web 14. However, as shown by following the dashed lines 44 from the blade 20 to the anvil 16, to achieve uniform perforation lengths PL and/or non-perforated lengths NP, the lengths of the teeth 36 (or recessed portions 38) must vary along the length of the blade 20. For example, tooth length $TL_1$ is longer than $TL_2$, as shown in FIG. 19, yet each produce a perforation having substantially the same perforation length LP along the shaped anvil 16. Similarly, $RL_1$ is longer than $RL_2$, but such spacing or non-perforation portion produce substantially uniform non-perforated lengths NP along the shaped anvil 16.

Each tooth length TL can be individually predetermined such that its projected contacting relationship onto the anvil 16 delimits a length of the anvil 16 substantially equal to a desired perforation length PL in the web 14. Each recessed portion length RL is individually predetermined such that its projected relationship with respect to the anvil 16 delimits a length of the anvil 16 substantially equal to a desired bond area having non-perforated length NP in the web 14. For example, each tooth length TL and recessed portion length RL can be designed such that the lines of weakness 21 in the web 14 comprises perforations 22 that are longer at the edge of the web 14 compared to the perforations toward the middle of the web 14, or bond areas 23 that are shorter near the edge compared to the bond areas toward the middle of the web 14.

Figure 20:
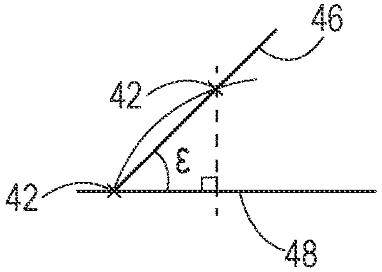
FIG. 20 is a schematic representation of a portion of an anvil indicating perforating length or non-perforating length to determine the tooth length or recessed portion length in accordance with one non-limiting embodiment of the present disclosure.
Figure 21:
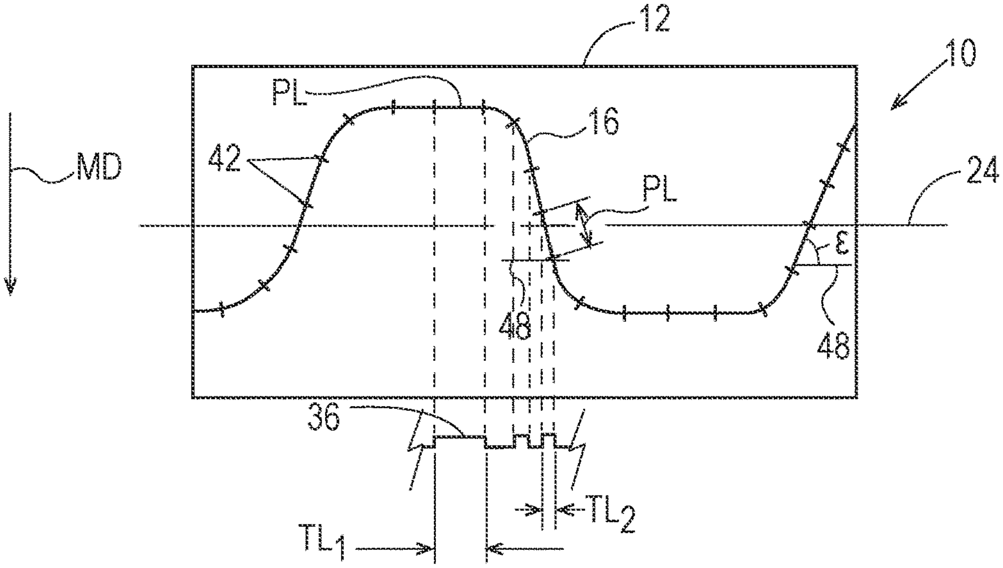
FIG. 21 is a schematic representation of a notched blade disposed on a support and a shaped anvil disposed in a cylinder in accordance with one non-limiting embodiment of the present disclosure.

Referring now to FIGS. 20 and 21, the tooth length TL and recessed portion length RL for an individual tooth 36 and recessed portion 38 on the blade 20 can be calculated. In one example embodiment, the tooth length TL or the recessed portion length RL can be determined by first measuring or predetermining a desired perforation length PL or non-perforation length NP, as shown between adjacent hash marks 42. Next, connect adjacent harsh marks 42 with a straight line 46 and intersection the straight line 46 with a line 48 substantially parallel to the outside edge of the blade 20 forming an angle ε. The straight line 46 should intersect the substantially parallel line 48 at a hash mark 42 so that the angle ε is less than about 90 degrees. Assuming that the tooth 36 and/or recessed portion 38 has a surface that is substantially parallel to the outer surface 30 of the cylinder 12, the trigonometry of a right triangle can be used to calculate the tooth length TL and the recessed length RL. More specifically, still referring to FIG. 20, the tooth length TL or recessed portion length RL can be calculated as the desired perforation length PL or non-perforation length NP times the cosine of the angle ε. Similarly, if the a certain tooth length TL or recessed portion length RL is known, the perforation length PL or non-perforation length NP can be calculated using the geometry of a right triangle. Thus, the notch length NL and recessed portion length RL can be determined for any adjacent harsh marks 42. Additionally, one of ordinary skill in the art would understand that if the blade 20 was not parallel to the outer surface 30 of the cylinder 12, the resulting triangle would not have a right angle and more advance trigonometry such as the law of sines, law of cosines, and law of tangents could be used to determine the angles and lengths.

Further to the above, in one embodiment, the perforating apparatus 10 can comprise a shaped anvil 16, disposed on the rotating cylinder 12, comprising a plurality of teeth 36 and one or more recessed portions 38, and a blade 20 having a substantially smooth edge, not shown. The perforating apparatus 10 imparts a line of weakness 21 onto the web 14. The line of weakness 21 will have perforations 22 and bond areas 23 that directly correspond to the teeth 36 and recessed portions 38 of the notched, shaped anvil 16. Stated another way, when the shaped anvil 16 is notched, having one or more recessed portions 38 and one or more teeth 36, the location of the recessed portions 38 will substantially correspond to the location of bond areas 23 on the line of weakness 21 and the location of the teeth 36 will substantially correspond to the location of the perforations 22 on the line of weakness 21. Thus, when the shaped anvil 16 is notched, the design of the recessed portions 38 and teeth 36 should be done in a manner to directly reflect the desired characteristics of the line of weakness 21.

An example embodiment of the web 14 produced by the present disclosure is shown in FIG. 22. The web 14 can comprise one or more lines of weakness 21. The line of weakness 21 can be substantially the same or similar to the curvilinear shape as that of the anvil 16, as was discussed more fully above. The curvilinear line of weakness 21 can comprise a plurality of perforations 22 and bond areas 23 between adjacent perforations 22. Each of the plurality of perforations 22 has a perforation length PL that can be substantially the same or different with respect to each other perforation length PL across the curvilinear line of weakness 21. Similarly, between each adjacent perforation 22 can be a bond area 23 having a non-perforation length NP that can be substantially the same or different relative to other and/or adjacent bond areas. Substantially can refer to the degree of similarity between two comparable units, and, more specifically, refers to those comparable units that are within about 15% of one another. Further, the plurality of perforations 22 can protrude through one or more plies of the web 14.

As previously stated, each of the plurality of perforations has a perforation length and each of the bond areas has a non-perforation length. In one example embodiment at least two of the perforation lengths are substantially equal. In another example embodiment, at least two of the non-perforation lengths are substantially equal. In yet another example embodiment at least two of the non-perforation lengths are substantially unequal and at least two of the perforation lengths are substantially unequal. In still another example embodiment, the curvilinear line of weakness 21 can comprise at least one wavelength 34, and the one or more perforations 22 and bond areas 23 can be imparted to the web 14 such that the perforation lengths PL near the edge of the web 14 are longer than the perforation lengths PL near the middle of the web 14 and/or the non-perforation lengths NP are shorter near the edge of the web 14 and longer near the middle of the web 14. Similarly, the perforations 22 and bond area 23 can be imparted to the web 14 such that the perforation lengths PL are substantially the same at the crest and trough of the wavelength 34 and different between the crest and the trough of the wavelength 34. Further, the perforations 22 and bond area 23 can be imparted to the web 14 such that the non-perforation lengths PL are substantially the same length at the crest and trough of the wavelength 34 and a different length between the crest and the trough of the wavelength 34.

A curvilinear line of weakness 21 can allow manufacturers to create a product that consumers can more easily and readily interact with. For example, a notched blade 20 or notched anvil 16 can be designed such that a shaped line of weakness 21 can tear more easily than, or at least as easy as, a straight line of weakness 21. Generally, the ease with which an absorbent sheet product is torn at the line of weakness is directly associated with the tensile strength of the line of weakness. It is known that the lower the perforation tensile strength, the easier the absorbent sheet product will separate at the line of weakness. The following data, shown in Table 1 below, illustrates the difference in the perforation tensile strength required to tear a shaped, also referred to as curvilinear or nonlinear, line of weakness 21 as compared to that of a straight, also referred to as linear, line of weakness across a full sheet of absorbent tissue product.

The data shown in Table 1 was gathered using the Tensile Strength Test Method as outline below. Generally, the data shows that the peak tensile strength for a shaped line of weakness is less than the peak tensile strength for a straight line of weakness. The peak tensile strength is the maximum force reached along the line of weakness upon completely tearing the line of weakness. As evidenced by Table 1 below, generally, the peak tensile strength of a shaped line of weakness is from about 1% to about 40% less than the peak tensile strength of a straight line of weakness imparted to the web 14 under similar manufacturing conditions, such as blade tooth length and recessed portion length. Stated another way, a shaped line of weakness imparted by the apparatus and method of the present disclosure can have a peak tensile strength that is generally at least about one percent and/or at least about 5% and/or at least about 10% and/or at least about 20% less than the peak tensile strength of a straight line of weakness.

Similar to the above, Table 1 also illustrates that the failure TEA (total energy absorbed) is generally less for a shaped line of weakness as compared to a straight line of weakness. The failure TEA is the area under the curve between the point of initial tensioning of the sanitary tissue product to the point at which the shaped line of weakness has failed. The failure point of the shaped line of weakness is designated by the tension falling below 5% of the peak load. As evidenced in Table 1, generally, the failure TEA of the shaped line of weakness is from about 1% to about 50% and/or about from about 1% to about 30% and/or about 1% to about 20% less than the failure TEA of the straight line of weakness.

TABLE 1

| Shaped Anvil Amplitude (inches) | Shaped Anvil Wavelength (inches) | Full Sanitary Tissue Product Sheet Line of Weakness Peak Load (grams) | % Difference in Peak Load from Straight Line of Weakness (control) | Full Sanitary Tissue Product Sheet (4") Line of Weakness Failure TEA (g*in/in) | % Difference in Failure TEA from Straight Line of Weakness (control) | Blade Recessed Portion Length (inches) | No. of Recessed Portions per 4.5" Blade | % Bond Area | Blade Tooth Length (inches) |
|---|---|---|---|---|---|---|---|---|---|
| 0 | 0 | 604 | Control | 49.0 | Control | 0.032 | 38 | 27% | 0.083 |
| 0.06 | 1.35 | 545 | −10% | 42.0 | −14% | 0.032 | 38 | 27% | 0.083 |
| 0.10 | 1.35 | 593 | −2% | 49.3 | 1% | 0.032 | 38 | 27% | 0.083 |
| 0.15 | 1.35 | 608 | 1% | 45.7 | −7% | 0.032 | 38 | 27% | 0.083 |
| 0.17 | 0.90 | 551 | −9% | 39.5 | −19% | 0.032 | 38 | 27% | 0.083 |
| 0.17 | 1.35 | 579 | −4% | 44.2 | −10% | 0.032 | 38 | 27% | 0.083 |
| 0.19 | 1.35 | 585 | −3% | 43.1 | −12% | 0.032 | 38 | 27% | 0.083 |
| 0.22 | 1.35 | 611 | 1% | 44.3 | −10% | 0.032 | 38 | 27% | 0.083 |
| 0.38 | 1.56 | 592 | −2% | 46.5 | −5% | 0.032 | 38 | 27% | 0.083 |
| 0.56 | 1.35 | 484 | −20% | 32.9 | −33% | 0.032 | 38 | 27% | 0.083 |
| 0.56 | 1.94 | 524 | −13% | 34.7 | −29% | 0.032 | 38 | 27% | 0.083 |
| 0 | 0 | 688 | Control | 60.2 | Control | 0.013 | 99 | 29% | 0.032 |
| 0.06 | 1.35 | 456 | −34% | 30.4 | −49% | 0.013 | 99 | 29% | 0.032 |
| 0.10 | 1.35 | 716 | 4% | 76.5 | 27% | 0.013 | 99 | 29% | 0.032 |
| 0.15 | 1.35 | 609 | −11% | 52.0 | −14% | 0.013 | 99 | 29% | 0.032 |
| 0.17 | 0.90 | 516 | −25% | 39.2 | −35% | 0.013 | 99 | 29% | 0.032 |
| 0.17 | 1.35 | 588 | −15% | 53.7 | −11% | 0.013 | 99 | 29% | 0.032 |
| 0.19 | 1.35 | 557 | −19% | 41.7 | −31% | 0.013 | 99 | 29% | 0.032 |
| 0.22 | 1.35 | 561 | −18% | 47.7 | −21% | 0.013 | 99 | 29% | 0.032 |
| 0.38 | 1.56 | 599 | −13% | 56.0 | −7% | 0.013 | 99 | 29% | 0.032 |
| 0.56 | 1.35 | 428 | −38% | 28.4 | −53% | 0.013 | 99 | 29% | 0.032 |
| 0.56 | 1.94 | 492 | −29% | 37.0 | −38% | 0.013 | 99 | 29% | 0.032 |
| 0 | 0 | 462 | Control | 30.3 | Control | 0.026 | 33 | 19% | 0.106 |
| 0.06 | 1.35 | 433 | −6% | 27.9 | −8% | 0.026 | 33 | 19% | 0.106 |
| 0.1 | 1.35 | 557 | 21% | 51.7 | 71% | 0.026 | 33 | 19% | 0.106 |
| 0.15 | 1.35 | 456 | −1% | 27.9 | −8% | 0.026 | 33 | 19% | 0.106 |
| 0.17 | 0.9045 | 424 | −8% | 25.7 | −15% | 0.026 | 33 | 19% | 0.106 |
| 0.17 | 1.35 | 452 | −2% | 28.6 | −6% | 0.026 | 33 | 19% | 0.106 |
| 0.1875 | 1.35 | 404 | −12% | 22.1 | −27% | 0.026 | 33 | 19% | 0.106 |
| 0.22 | 1.35 | 476 | 3% | 30.6 | 1% | 0.026 | 33 | 19% | 0.106 |
| 0.375 | 1.5625 | 476 | 3% | 45.9 | 52% | 0.026 | 33 | 19% | 0.106 |
| 0.5625 | 1.35 | 377 | −18% | 21.1 | −30% | 0.026 | 33 | 19% | 0.106 |
| 0.5625 | 1.94 | 419 | −9% | 26.7 | −12% | 0.026 | 33 | 19% | 0.106 |
| 0 | 0 | 810 | Control | 86.8 | Control | 0.041 | 40 | 37% | 0.069 |
| 0.06 | 1.35 | 668 | −18% | 73.2 | −16% | 0.041 | 40 | 37% | 0.069 |
| 0.1 | 1.35 | 814 | 1% | 89.1 | 3% | 0.041 | 40 | 37% | 0.069 |
| 0.15 | 1.35 | 794 | −2% | 83.9 | −3% | 0.041 | 40 | 37% | 0.069 |
| 0.17 | 0.9045 | 751 | −7% | 77.3 | −11% | 0.041 | 40 | 37% | 0.069 |
| 0.17 | 1.35 | 785 | −3% | 79.3 | −9% | 0.041 | 40 | 37% | 0.069 |
| 0.1875 | 1.35 | 840 | 4% | 87.5 | 1% | 0.041 | 40 | 37% | 0.069 |
| 0.22 | 1.35 | 771 | −5% | 79.6 | −8% | 0.041 | 40 | 37% | 0.069 |
| 0.375 | 1.5625 | 778 | −4% | 81.6 | −6% | 0.041 | 40 | 37% | 0.069 |
| 0.5625 | 1.35 | 667 | −18% | 57.7 | −34% | 0.041 | 40 | 37% | 0.069 |
| 0.5625 | 1.94 | 709 | −13% | 64.4 | −26% | 0.041 | 40 | 37% | 0.069 |

Figure 23A:
FIGS. 23A-Q are schematic representations of the shape of a line of weakness in accordance with one non-limiting embodiment of the present disclosure.
Figure 23B:
Figure 23C:
Figure 23D:
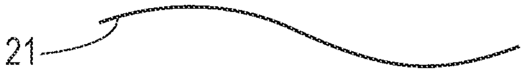
Figure 23E:
Figure 23F:
Figure 23G:
Figure 23H:
Figure 23I:
Figure 23J:
Figure 23K:
Figure 23L:
Figure 23M:
Figure 23N:
Figure 23O:
Figure 23P:
Figure 23Q:

Further, a shaped line of weakness 21 on a sanitary tissue paper product, for example, allows consumers to more easily grasp and dispense the exposed sheet of the product due to the shaped line of weakness 21 creating a series of tabs or a visually identifiable edge. Still further, the shaped line of weakness 21 can allow consumers to readily distinguish a product from other manufacturer's products by having a visually distinctive perforation, such as one that complements an emboss or print pattern. FIGS. 23A-Q illustrate various shapes of the curvilinear line of weakness 21 that can be imparted to the web. One of ordinary skill in the art based on the aforementioned disclosure would understand that the shape of the line of weakness 21 is due in part to the shape of the shaped anvil 16 or shaped blade 20 disposed on the rotating cylinder 12. Thus, the shapes shown in FIGS. 23A-Q could also be the profiles of the shaped anvil 16 or shaped blade 20 disposed on the rotating cylinder 12. Generally, the profiles depicted in FIGS. 23 A-Q can be described as exhibiting a sinusoidal shape, as being a group of two or more linear elements each connecting at a single inflection point with an adjacent linear element, or a combination of curvilinear and linear elements.

In another example embodiment, the cylinder 12 can comprise a shaped blade 20 and the support 18 can comprise a straight, linear anvil 16, not shown. Likewise, in another example embodiment, the cylinder 12 can comprise a shaped blade 20 and the support 18 can comprise a straight, linear blade. The above description applies to either of the recited configurations.

Tensile Strength Test Method

Elongation, Tensile Strength, TEA and Tangent Modulus are measured by or calculated from data generated by a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing the full width of one sheet material. For example, the Thwing-Albert item #734K grips are suitable for testing a sheet having about a four inch width. An air pressure of about 60 psi is supplied to the jaws.

Unless otherwise specified, all tests described herein, including those described in the detailed description, are conducted on samples that have been conditioned in a conditioned room at a temperature of 73° F.±2° F. (23° C.±1° C.) and a relative humidity of 50% (±2%) for 2 hours prior to the test. All tests are conducted in such conditioned room(s). All plastic and paper board packaging materials must be carefully removed from the paper samples prior to testing. If the sample is in roll form, remove at least the leading five sheets by unwinding and tearing off via the closest line of weakness, and discard before testing the sample. Do not test sheet samples with defects such as perforation skips, wrinkles, tears, incomplete perforations, holes, etc.

A full finished product width sheet sample of a paper towel or bath tissue product is cut so that a perforation line passes across the sheet parallel to each cut in the width dimension. More specifically, take two adjacent sheets separated by a line of weakness (comprising one or more perforations), and cut a test sample to include at least a portion of the two tissue sheets. The cuts should be made across the width of the sheet generally parallel to the line of perforation and equally about the line of perforation. For example, the first cut is made at least two inches above the line of weakness comprising perforations and another cut is made on the other side of the line of weakness at least two inches from the line of weakness comprising perforations. At all times the sample should be handled in such a manner that perforations are not damaged or weakened. The prepared sample is placed in the grips so that no part of the line of weakness is touching or inside the clamped grip faces. Further, the line of weakness should be generally parallel to the grip. Stated another way, if an imaginary line were drawn across the width of the sheet connecting the two points at which the line of weakness crosses the edge of the sheet, the imaginary line should be generally parallel to the longitudinal axis of the grips (i.e., perpendicular to the direction of elongation).

Program the tensile tester to perform an extension test, collecting force and extension data at an acquisition rate of 20 Hz as the crosshead raises at a rate of 4.00 in/min (10.16 cm/min) until the specimen breaks (i.e., when the test specimen is physically separated into two parts). The break sensitivity is set to 98%, i.e., the test is terminated when the measured force drops to ≤2% of the maximum peak force, after which the crosshead is returned to its original position.

Set the gage length to 2.0 inches. Zero the crosshead position and load cell. Insert the sheet sample into the upper and lower open grips such that at least 0.5 inches of sheet length is contained each grip. Verify sheet sample is properly aligned, as previously discussed, and then close lower and upper grips. The sheet sample should be under enough tension to eliminate any slack, but less than 5 g of force measured on the load cell. Start the tensile tester and data collection.

The location of failure (break) should be the line of weakness. Each sample sheet should break completely at the line of weakness. The peak force to tear the line of weakness is reported in grams. If the location of the failure (break) is not the line of weakness, disregard the data and repeat the test with another sheet sample. Note, the output result is for the entire sheet sample and therefore does not need to be normalized.

Adjusted Gage Length is calculated as the extension measured at 5 g of force (in) added to the original gage length (in).

Peak Tensile is calculated as the force at the maximum or peak force. The result is reported in units of g/in, to the nearest 1 g/in. Note the output results are for the entire sheet sample width and is not normalized.

Failure Total Energy Absorption (Fail_TEA) is calculated as the area under the force curve integrated from zero extension to the extension at the "failure" point (g*in), divided by the adjusted Gage Length (in). The failure point is defined here as the extension when the tension force falls to 5% of the maximum peak force. This is reported with units of g*in/in to the nearest 1 g*in/in. Again, note that the output results are for the entire sheet sample width.

Repeat the above mentioned steps for each sample sheet. Four sample sheets should be tested and the results from those four tests should be averaged to determine a reportable data point. The data generated in Table 1 above represents data points of an average of four measures generated from the above test method.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to this disclosure or that claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for perforating a web with a perforating apparatus, the method comprising:

rotating a cylinder about a longitudinal cylinder axis, wherein the cylinder comprises at least one anvil;

operatively engaging a moveable support with the cylinder;

positioning a blade disposed on the support so as to cooperate in contacting relationship with the anvil, wherein at least one of the blade and the anvil defines a linear shape and wherein at least one of the blade and the anvil defines a non-linear shape, wherein at least one of the blade and the anvil comprises a plurality of teeth, wherein adjacent teeth are separated by a recessed portion, wherein each of the plurality of teeth has a tooth length and each recessed portion has a recessed portion length, and wherein each tooth length and each recessed portion length are non-uniform;

feeding a web between the cylinder and the support; and perforating the web as the anvil cooperates in contacting relationship with the blade, wherein the web comprises perforated portions and non-perforated portions, and wherein the perforated portions and the non-perforated portions are uniform.

2. The method of claim 1, wherein the blade is disposed in a blade holder, and wherein the blade holder is disposed on the support.

3. The method of claim 1, wherein the cylinder has a diameter of about 5 inches to about 20 inches and a length of about 10 inches to about 150 inches.

4. The method of claim 1, wherein the web is at least one of bath tissue and towel tissue.

5. The method of claim 1, wherein the web comprises a longitudinal web axis, wherein the longitudinal web axis is substantially parallel to the machine direction.

6. The method of claim 1, wherein the cylinder and the support are at an angle of about 0 degrees to about 45 degrees from the cross machine direction, wherein the cross machine direction is substantially perpendicular to a longitudinal web axis.

7. The method of claim 1, wherein the blade comprises a plurality of blades.

8. The method of claim 1, wherein the anvil is helically mounted on the rotating cylinder at an angle of greater than 0 degrees to about 45 degrees to the longitudinal cylinder axis.

9. The method of claim 1, wherein the anvil is helically mounted on the rotating cylinder at an angle of about 4 degrees to about 8 degrees to the longitudinal cylinder axis.

10. The method of claim 1, further comprising operatively engaging the anvil and the blade to form an interaction point therebetween, wherein the interaction point is from about 0.0001 inches to about 0.01 inches.

11. The method of claim 1, wherein the anvil is removably attached to an outer surface of the cylinder.

12. The method of claim 1, wherein the anvil comprises one or more anvil segments.

13. The method of claim 1, wherein one or more anvils are disposed radially about an outer surface of the cylinder.

14. The method of claim 1, wherein at least one of the blade and the anvil is smooth-edged.

15. A method for making non-linear perforations, the method comprising:

rotating a cylinder about a longitudinal cylinder axis, wherein the cylinder comprises at least one anvil, wherein at least a portion of the anvil is shaped in a non-linear path of a desired perforation on a web;

operatively engaging a moveable support with the cylinder;

positioning a blade disposed on the moveable support, wherein the blade comprises linear portions, the blade having a plurality of teeth such that the teeth cooperate in contacting relationship with the anvil, each tooth having a tooth length, and each tooth being separated from an adjacent tooth by a recessed portion defining a recessed portion length, wherein each tooth length and each recessed portion length are uniform;

wherein each tooth length is individually predetermined such that its projected contacting relationship onto the anvil delimits a length of the anvil equal to a desired length of a perforation in the web, and each recessed portion length is individually predetermined such that its projected relationship with respect to the anvil delimits a length of the anvil equal to a desired length of a non-perforated portion of the web;

feeding the web between the cylinder and the support as the teeth of the blade cooperate in contacting relationship with the anvil; and perforating the web with one or more perforation lengths and one or more non-perforation lengths in the non-linear path, wherein the web comprises a plurality of perforated portions and a plurality of non-perforated portions, and wherein the plurality of perforated portions and the plurality of non-perforated portions are non-uniform.

* * * * *